US012632127B2

(12) United States Patent
Tiwari et al.

(10) Patent No.: US 12,632,127 B2
(45) Date of Patent: May 19, 2026

(54) SYSTEM AND METHOD OF ACTION-BASED NAVIGATION VISUALIZATION FOR SUPPLY CHAIN PLANNERS AND SPECIALLY-ABLED USERS

(71) Applicant: Blue Yonder Group, Inc., Scottsdale, AZ (US)

(72) Inventors: Mayank Tiwari, Serilingampalle (IN); Pankaj Rathoure, Hyderabad (IN); Anirban Bhattacharyya, Ammenpur (IN); Santosh Kumar, Jharkhand (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 19/098,808

(22) Filed: Apr. 2, 2025

(65) Prior Publication Data

US 2025/0258552 A1 Aug. 14, 2025

Related U.S. Application Data

(63) Continuation of application No. 17/892,728, filed on Aug. 22, 2022, now Pat. No. 12,277,278.

(Continued)

(51) Int. Cl.
*G06F 3/023* (2006.01)
*G06F 3/02* (2006.01)
(Continued)

(52) U.S. Cl.
CPC .......... *G06F 3/0237* (2013.01); *G06F 3/0227* (2013.01); *G06F 9/453* (2018.02);
(Continued)

(58) Field of Classification Search
CPC ............... G06F 3/0237; G06F 3/0227; G06Q 10/06316; G06Q 10/087
(Continued)

(56) References Cited

U.S. PATENT DOCUMENTS 5,390,281 A * 2/1995 Luciw ..................... G06F 9/453
706/53
9,508,339 B2 11/2016 Kannan et al.
(Continued)

OTHER PUBLICATIONS

Nike.com (https://www.nike.com/us/en/help, Aug. 20, 2021, retrieved from https://web.archive.org/web/20210820183538/https://www.nike.com/us/en/help) (Year: 2021).*

*Primary Examiner* — Mark Edwards
(74) *Attorney, Agent, or Firm* — Spencer Fane LLP; Steven J. Laureanti

(57) ABSTRACT

A system and method are disclosed for predicting recommendations for a user interface. The method includes generating a graphical user interface that receives an input from a user of a client portal, crawling tasks associated with the user in the client portal, ranking the tasks according to an intent associated with the input from the user, fetching at least one task from the ranked tasks, calculating a quantity of steps to complete the task from the ranked tasks; identifying one or more slots used by the task in at least one step from the quantity of steps, and generating one or more recommendations comprising a subsequent action for the user to complete the task.

20 Claims, 17 Drawing Sheets

Related U.S. Application Data

(60) Provisional application No. 63/236,100, filed on Aug. 23, 2021, provisional application No. 63/236,099, filed on Aug. 23, 2021.

(51) Int. Cl.

| | |
|---|---|
| *G06F 9/451* | (2018.01) |
| *G06F 16/958* | (2019.01) |
| *G06F 40/20* | (2020.01) |
| *G06Q 10/0631* | (2023.01) |
| *G06Q 10/087* | (2023.01) |

(52) U.S. Cl.
CPC ............ *G06F 16/958* (2019.01); *G06F 40/20* (2020.01); *G06Q 10/06316* (2013.01); *G06Q 10/087* (2013.01)

(58) Field of Classification Search
USPC ........................................................ 345/168
See application file for complete search history.

(56) References Cited

U.S. PATENT DOCUMENTS

| | | | |
|---|---|---|---|
| 10,496,705 | B1 | 12/2019 | Irani et al. |
| 11,176,598 | B2 | 11/2021 | D'Souza et al. |
| 11,410,075 | B2 | 8/2022 | Pal et al. |
| 12,093,873 | B2 | 9/2024 | Park et al. |
| 2020/0184540 | A1* | 6/2020 | D'Souza .................. G06N 3/08 |

* cited by examiner

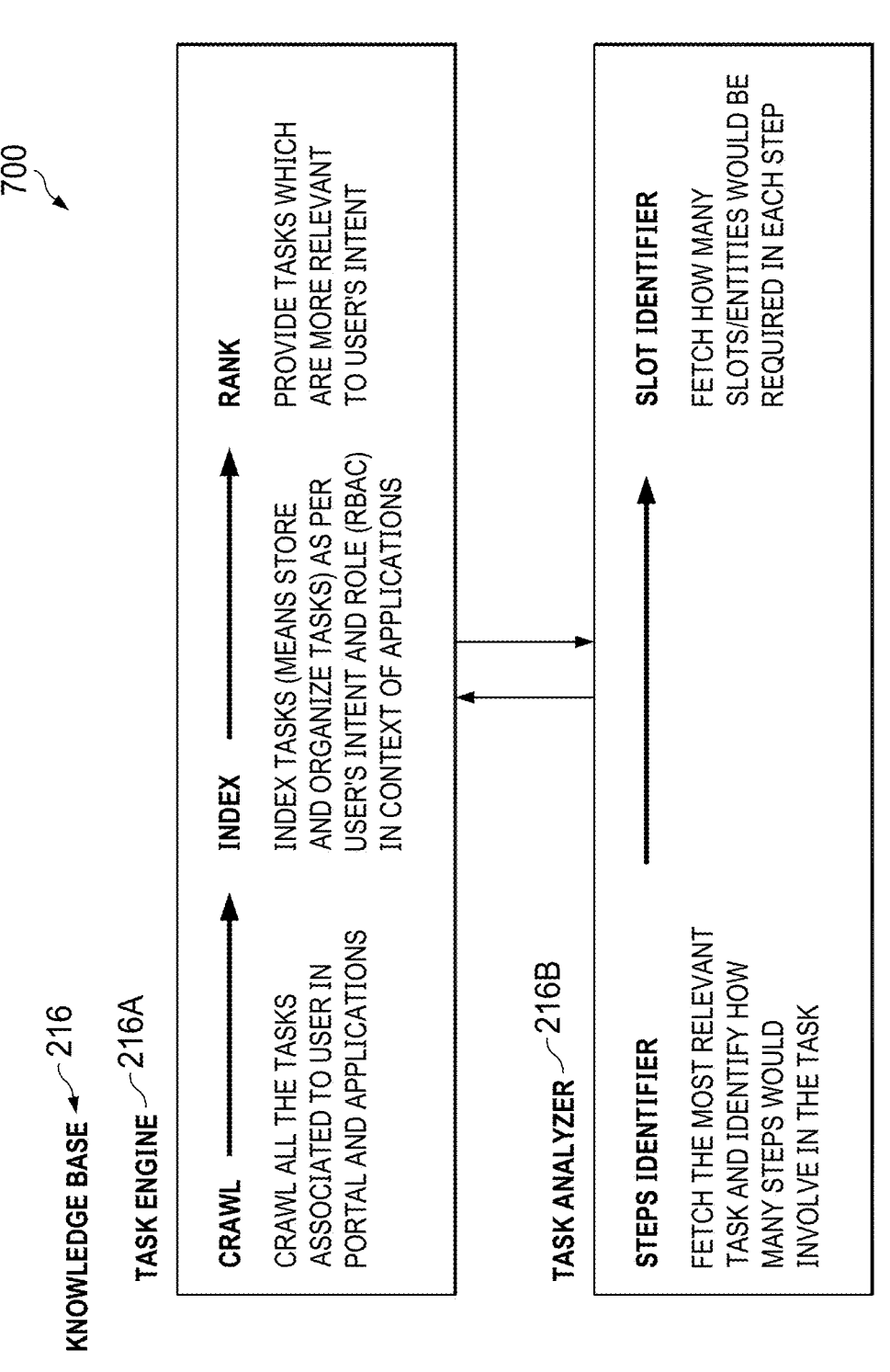

700

KNOWLEDGE BASE — 216

TASK ENGINE — 216A

CRAWL

CRAWL ALL THE TASKS ASSOCIATED TO USER IN PORTAL AND APPLICATIONS

INDEX

INDEX TASKS (MEANS STORE AND ORGANIZE TASKS) AS PER USER'S INTENT AND ROLE (RBAC) IN CONTEXT OF APPLICATIONS

RANK

PROVIDE TASKS WHICH ARE MORE RELEVANT TO USER'S INTENT

TASK ANALYZER — 216B

STEPS IDENTIFIER

FETCH THE MOST RELEVANT TASK AND IDENTIFY HOW MANY STEPS WOULD INVOLVE IN THE TASK

SLOT IDENTIFIER

FETCH HOW MANY SLOTS/ENTITIES WOULD BE REQUIRED IN EACH STEP

TASK ENGINE COULD BE CONTROLLED BY META DATA SHARED BY USER AND USAGE OF SYSTEM

FIG. 7

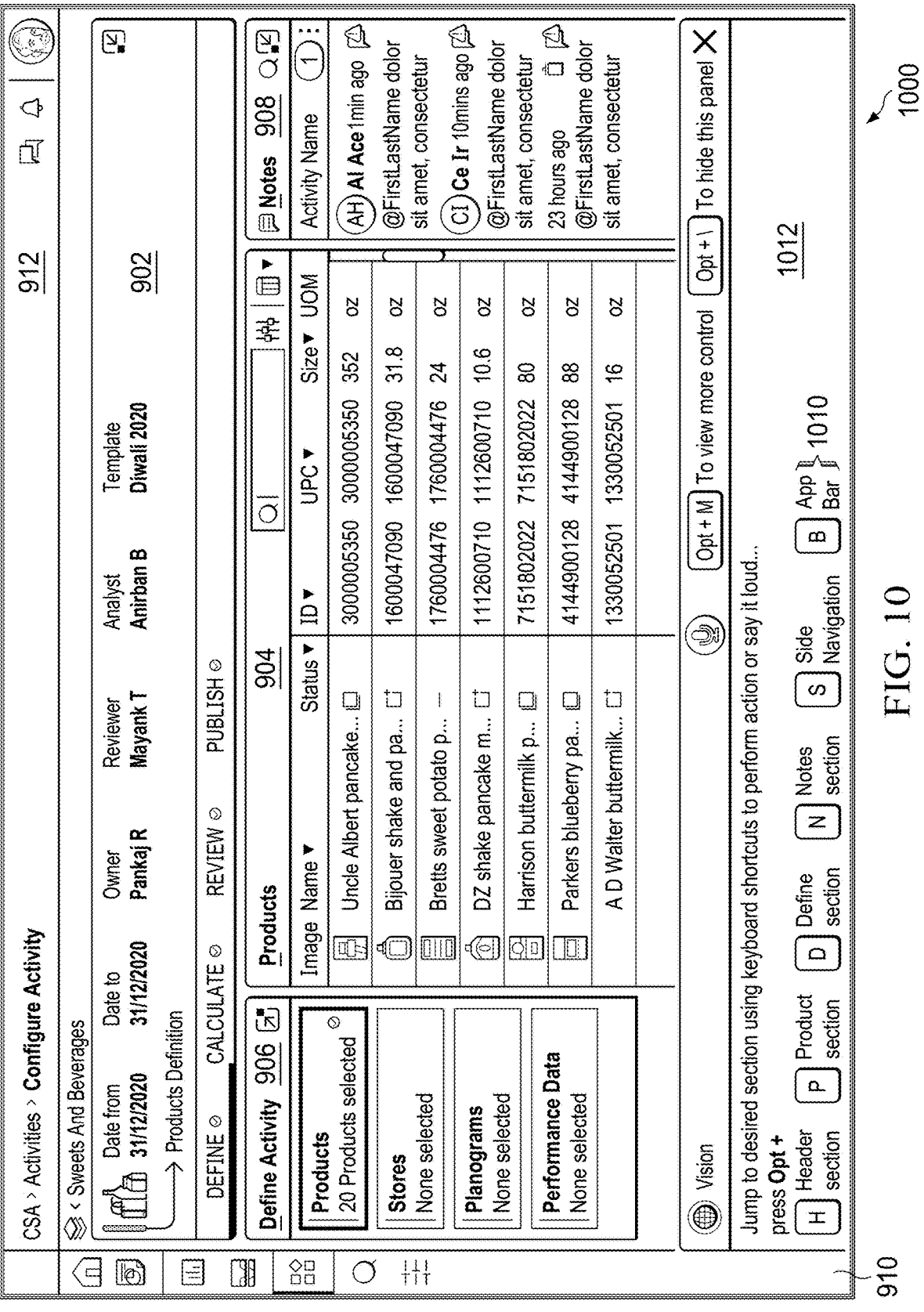

CSA › Activities › Configure Activity     912

‹ Sweets And Beverages

| Date from | Date to | Owner | Reviewer | Analyst | Template |
|---|---|---|---|---|---|
| 31/12/2020 | 31/12/2020 | Pankaj R | Mayank T | Anirban B | Diwali 2020 |

→ Products Definition     902

DEFINE ⊙     CALCULATE ⊙     REVIEW ⊙     PUBLISH ⊙

Define Activity 906     Products 904

| Products | Image | Name ▾ | Status ▾ | ID ▾ | UPC ▾ | Size ▾ | UOM |
|---|---|---|---|---|---|---|---|
| 20 Products selected | | Uncle Albert pancake... | ☐ | 3000005350 | 3000005350 | 352 | oz |
| Stores | | Bijouer shake and pa... | ☐ | 1600047090 | 1600047090 | 31.8 | oz |
| None selected | | Bretts sweet potato p... | — | 1760004476 | 1760004476 | 24 | oz |
| Planograms | | DZ shake pancake m... | ☐ | 1112600710 | 1112600710 | 10.6 | oz |
| None selected | | Harrison buttermilk p... | ☐ | 7151802022 | 7151802022 | 80 | oz |
| Performance Data | | Parkers blueberry pa... | ☐ | 4144900128 | 4144900128 | 88 | oz |
| None selected | | A D Walter buttermilk... | ☐ | 1330052501 | 1330052501 | 16 | oz |

Notes 908

Activity Name ⊙ ①

(AH) Al Ace 1min ago
@FirstLastName dolor sit amet, consectetur (CI) Ce Ir 10mins ago
@FirstLastName dolor sit amet, consectetur 23 hours ago
@FirstLastName dolor sit amet, consectetur To hide this panel ✕

1012

Vision

Jump to desired section using keyboard shortcuts to perform action or say it loud...
press Opt +

[H] Header section   [P] Product section   [D] Define section   [N] Notes section

[Opt + M] To view more control   [Opt + \]

[Opt + M] To view more control   [B] Side Navigation   [S] Side Navigation

App Bar 1010

SYSTEM AND METHOD OF ACTION-BASED NAVIGATION VISUALIZATION FOR SUPPLY CHAIN PLANNERS AND SPECIALLY-ABLED USERS

CROSS-REFERENCE TO RELATED APPLICATIONS

This application is a continuation of U.S. patent application Ser. No. 17/892,728, filed Aug. 22, 2022, entitled "System and Method of Action-Based Navigation Visualization for Supply Chain Planners and Specially-Abled Users," which claims the benefit under 35 U.S.C. § 119(e) to U.S. Provisional Application No. 63/236,099, filed Aug. 23, 2021, entitled "System and Method of Action-Based Navigation Visualization for Supply Chain Planners and Specially-Abled Users," and U.S. Provisional Application No. 63/236,100, filed Aug. 23, 2021, entitled "System and Method of Objection-Driven Intelligent Navigation." U.S. patent application Ser. No. 17/892,728 and U.S. Provisional Application Nos. 63/236,099 and 63/236,100 are assigned to the assignee of the present application.

TECHNICAL FIELD

The present disclosure relates generally to user interfaces and specifically to user interfaces with guided and predictive navigation.

BACKGROUND

Supply chain software is frequently a complex and intricate system, reflecting the complexity of supply chains themselves. As a result, existing supply chain software suffers from accessibility and ease-of-use problems, such as users becoming distracted by the amount of information available on screen at any one time, which may result in users losing their place in software navigation, spending too much time performing tasks in the supply chain software, and being unable to determine how to progress to their goal in the supply chain software. Further, existing supply chain systems provide little or no guidance to users attempting to navigate supply chain software, and may be completely inaccessible to specially-abled users. Thus, existing supply chain software has may lead to user experiences which are time consuming, confusing, error-prone and inaccessible to some potential users entirely, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 7 illustrates the task engine and the task analyzer of knowledge base 216, according to an embodiment;

FIG. 10 illustrates a card-based interface design, according to an embodiment;

DETAILED DESCRIPTION

Figure 1:
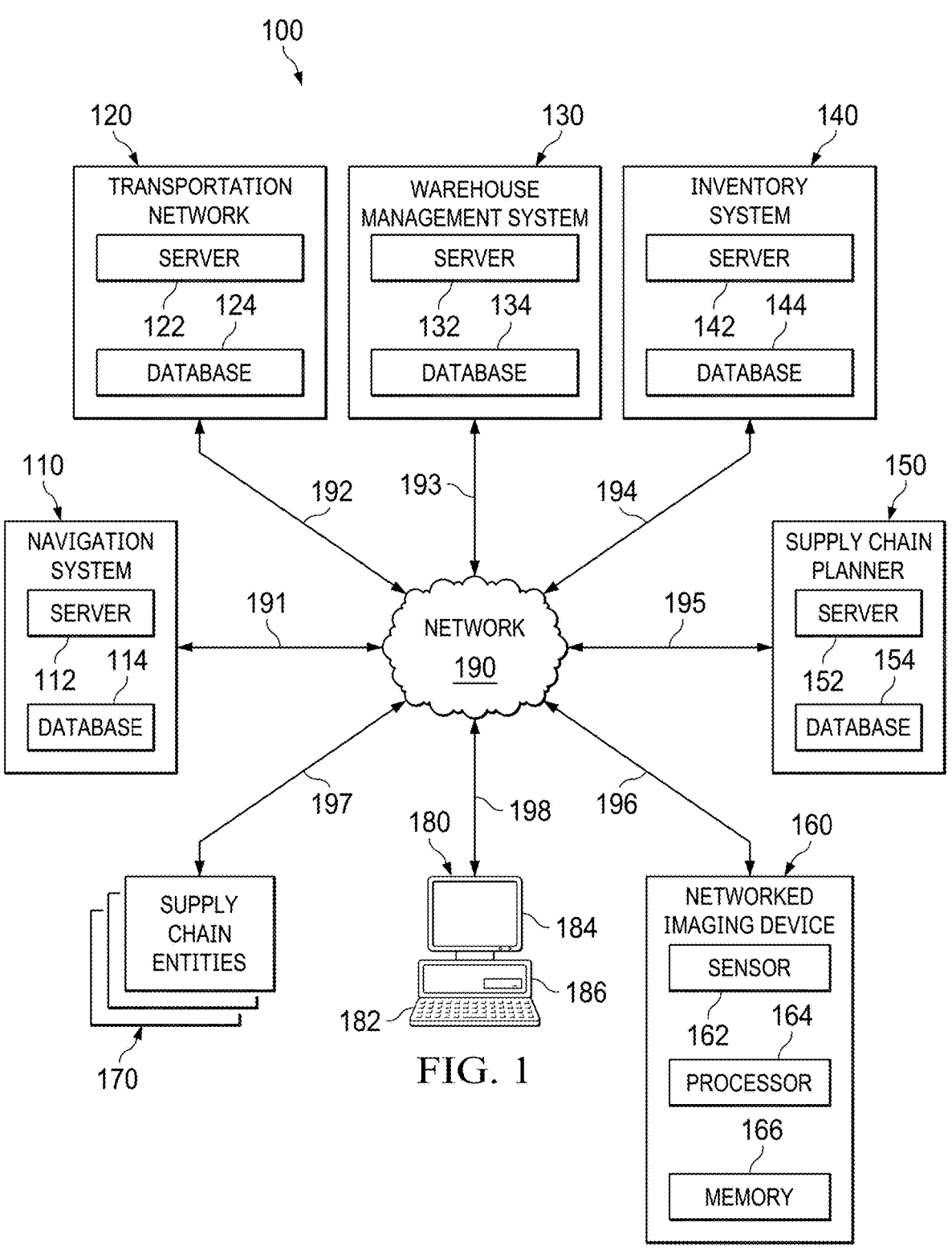
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Embodiments enable supply chain user interface systems which can use a machine learning based recommendation engine, which provides a user an actionable guide for navigation of supply chain software based on probabilities of supply chain decisions. Embodiments provide a framework for supply chain software which provides a goal-oriented end-to-end solution for recommending actions within a supply chain. Embodiments further provide an algorithm for supply chain navigation using probabilistic matrix factorization. This algorithm represents a robust formal mathematical framework to model assumptions in the supply chain network and study the effects of the assumptions in the recommendation process.

Embodiments provide supply chain software which helps users, including specially-abled users, to increase their efficiency using the supply chain software, and improve the navigation speed through the software. Embodiments provide supply chain software which is thus more accessible to specially-abled users. Embodiments may allow for easier guiding and learning through complex software, such as supply chain software. Embodiments provide efficient, consistent inputs which may be used to navigate supply chain software and enable data entry without the use of a mouse.

FIG. 1 illustrates supply chain network 100, in accordance with a first embodiment. Supply chain network 100 comprises navigation system 110, transportation network 120, warehouse management system 130, inventory system 140, supply chain planner 150, one or more networked imaging devices 160, one or more supply chain entities 170, computer 180, network 190, and one or more communication links 191-198. Although a single navigation system 110, transportation network 120, warehouse management system 130, inventory system 140, supply chain planner 150, a single networked imaging device 160, one or more supply chain entities 170, a single computer 180, a single network 190, and one or more communication links 191-198 are shown and described, embodiments contemplate any number of navigation systems 110, transportation networks 120, warehouse management systems 130, inventory systems 140, supply chain planners 150, networked imaging devices 160, supply chain entities 170, computers 180, networks 190, or communication links 191-198, according to particular needs.

In one embodiment, navigation system 110 comprises server 112 and database 114. Navigation system 110 generates a graphical user interface (GUI) with keyboard-based interactions and conversation engine 212 that uses natural language processing (NLP) to support voice- or text-based interactions. One or more modules of server 112 provide the GUI with simplified and context-dependent keyboard shortcuts for user interfaces having card-based design. In addition, navigation system 110 solves screen reader accessibility problems for data-intensive user interfaces and may include step-by-step navigated task guidance and dynamically-updated task and action shortcuts and context-specific navigations. Database 114 may comprise one or more databases or other data storage arrangement at one or more locations, local to, or remote from, server 112.

Transportation network 120 of supply chain network 100 comprises server 122 and database 124. Although transportation network 120 is illustrated as comprising a single server 122 and a single database 124, embodiments contemplate any suitable number of servers 122 or databases 124 internal to or externally coupled with transportation network 120. According to embodiments, transportation network 120 directs one or more transportation vehicles to ship one or more items between one or more supply chain entities 170, based, at least in part, on a supply chain plan, including a supply chain master plan, the number of items currently in stock at one or more supply chain entities 170 or other stocking location, the number of items currently in transit in transportation network 120, a forecasted demand, a supply chain disruption, and/or one or more other factors described herein. One or more transportation vehicles comprise, for example, any number of trucks, cars, vans, boats, airplanes, unmanned aerial vehicles (UAVs), cranes, robotic machinery, or the like. The one or more transportation vehicles may comprise radio, satellite, or other communication that communicates location information (such as, for example, geographic coordinates, distance from a location, global positioning satellite (GPS) information, or the like) with navigation system 110, transportation network 120, warehouse management system 130, inventory system 140, supply chain planner 150, networked imaging device 160, and/or one or more supply chain entities 170 to identify the location of the one or more transportation vehicles and the location of any inventory or shipment located on the one or more transportation vehicles.

Warehouse management system 130 of supply chain network 100 comprises server 132 and database 134. Although warehouse management system 130 is illustrated as comprising a single server 132 and a single database 134, embodiments contemplate any suitable number of servers 132 or databases 134 internal to or externally coupled with warehouse management system 130. According to embodiments, server 132 comprises one or more modules that manage and operate warehouse operations, plan timing and identity of shipments, generate picklists, packing plans, and instructions. Warehouse management system 130 instructs users and/or automated machinery to obtain picked items and generates instructions to guide placement of items on a picklist in the configuration and layout determined by a packing plan. For example, the instructions may instruct a user and/or automated machinery to prepare items on a picklist for shipment by obtaining the items from inventory or a staging area and packing the items on a pallet in a proper configuration for shipment. Embodiments contemplate warehouse management system 130 determining routing, packing, or placement of any item, package, or container into any packing area, including, packing any item, package, or container in another item, package, or container. Warehouse management system 130 may generate instructions for packing products into boxes, packing boxes onto pallets, packing loaded pallets into trucks, or placing any item, container, or package in a packing area, such as, for example, a box, a pallet, a shipping container, a transportation vehicle, a shelf, a designated location in a warehouse (such as a staging area), and the like.

Inventory system 140 of supply chain network 100 comprises server 142 and database 144. Although inventory system 140 is illustrated as comprising a single server 142 and a single database 144, embodiments contemplate any suitable number of servers 142 or databases 144 internal to or externally coupled with inventory system 140. Server 142 of inventory system 140 is configured to receive and transmit item data, including item identifiers, pricing data, attribute data, inventory levels, and other like data about one or more items at one or more stocking locations in supply chain network 100. Server 142 stores and retrieves item data from database 144 or from one or more locations in supply chain network 100.

Supply chain planner 150 of supply chain network 100 comprises server 152 and database 154. Although supply chain planner 150 is illustrated as comprising a single server 152 and a single database 154, embodiments contemplate any suitable number of servers 152 or databases 154 internal to or externally coupled with supply chain planner 150. Server 152 of supply chain planner 150 comprises one or more modules, such as, for example, a planning module 240, solver 244, modeler 242, and/or an engine, for performing activities of one or more planning and execution processes. Supply chain planner 150 may model and solve supply chain planning problems (such as, for example, operation planning problems).

One or more networked imaging devices 160 comprise one or more processors 164, memory 166, one or more sensors 162, and may include any suitable input device, output device, fixed or removable computer-readable storage media, or the like. According to embodiments, one or more networked imaging devices 160 comprise an electronic device that receives imaging data from one or more sensors 162 or from one or more databases in supply chain network 100. One or more sensors 162 of one or more networked imaging devices 160 may comprise an imaging sensor, such as, a camera, scanner, electronic eye, photodiode, charged coupled device (CCD), or any other electronic component that detects visual characteristics (such as color, shape, size, fill level, or the like) of objects. One or more networked imaging devices 160 may comprise, for example, a mobile handheld electronic device such as, for example, a smartphone, a tablet computer, a wireless communication device, and/or one or more networked electronic devices configured to image items using one or more sensors 162 and transmit product images to one or more databases. In addition, or as an alternative, one or more sensors 162 may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like objects that encode identifying information.

One or more supply chain entities 170 may include, for example, one or more retailers, distribution centers, manufacturers, suppliers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers.

As shown in FIG. 1, supply chain network 100 comprising navigation system 110, transportation network 120, warehouse management system 130, inventory system 140, supply chain planner 150, one or more networked imaging devices 160, and one or more supply chain entities 170 may operate on one or more computers 180 that are integral to or separate from the hardware and/or software that support navigation system 110, transportation network 120, warehouse management system 130, inventory system 140, supply chain planner 150, one or more networked imaging devices 160, and one or more supply chain entities 170. One or more computers 180 may include any suitable input device 182, such as a keypad, mouse, touch screen, microphone, or other device to input information. Output device 184 may convey information associated with the operation of supply chain network 100, including digital or analog data, visual information, or audio information.

One or more computers 180 may include fixed or removable computer-readable storage media 186, including a non-transitory computer readable medium, magnetic computer disks, flash drives, CD-ROM, in-memory device or other suitable media to receive output from and provide input to supply chain network 100. One or more computers 180 may include one or more processors and associated memory to execute instructions and manipulate information according to the operation of supply chain network 100 and any of the methods described herein. In addition, or as an alternative, embodiments contemplate executing the instructions on one or more computers 180 that cause one or more computers 180 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible computer-readable media that have computer-readable instructions encoded thereon, and the instructions may comprise instructions to perform functions of the methods described herein.

Navigation system 110, transportation network 120, warehouse management system 130, inventory system 140, supply chain planner 150, one or more networked imaging devices 160, and one or more supply chain entities 170 may each operate on one or more separate computers, network 190 of one or more separate or collective computers, or may operate on one or more shared computers. In addition, supply chain network 100 may comprise a cloud-based computing system having processing and storage devices at one or more locations, local to, or remote from navigation system 110, transportation network 120, warehouse management system 130, inventory system 140, supply chain planner 150, one or more networked imaging devices 160, and one or more supply chain entities 170. In addition, each of one or more computers 180 may be a workstation, personal computer (PC), network computer, notebook computer, tablet, personal digital assistant (PDA), cell phone, telephone, smartphone, mobile device, wireless data port, augmented or virtual reality headset, or any other suitable computing device. In an embodiment, one or more users may be associated with navigation system 110, transportation network 120, warehouse management system 130, inventory system 140, supply chain planner 150, one or more networked imaging devices 160, and one or more supply chain entities 170.

These one or more users may include, for example, a "manager" or a "planner" handling supply chain planning, configuring navigation system 110, and/or one or more related tasks within supply chain network 100. In addition, or as an alternative, these one or more users within supply chain network 100 may include, for example, one or more computers 180 programmed to autonomously handle, among other things, production planning, demand planning, option planning, sales and operations planning, operation planning, supply chain master planning, plan adjustment after supply chain disruptions, order placement, automated warehouse operations (including removing items from and placing items in inventory), robotic production machinery (including producing items), and/or one or more related tasks within supply chain network 100.

Although the communication links 191-198 are shown as generally coupling navigation system 110, transportation network 120, warehouse management system 130, inventory system 140, supply chain planner 150, networked imaging device 160, one or more supply chain entities 170, and computer 180 to network 190, each of navigation system 110, transportation network 120, warehouse management system 130, inventory system 140, supply chain planner 150, networked imaging device 160, one or more supply chain entities 170, and computer 180 may communicate directly with each other, according to particular needs. In another embodiment, network 190 includes the Internet and any appropriate local area networks (LANs), metropolitan area networks (MANs), or wide area networks (WANs) coupling navigation system 110, transportation network 120, warehouse management system 130, inventory system 140, supply chain planner 150, networked imaging device 160, one or more supply chain entities 170, and computer 180. For example, data may be maintained locally or externally of navigation system 110, transportation network 120, warehouse management system 130, inventory system 140, supply chain planner 150, networked imaging device 160, one or more supply chain entities 170, and computer 180 and made available to one or more associated users of navigation system 110, transportation network 120, warehouse management system 130, inventory system 140, supply chain planner 150, networked imaging device 160, one or more supply chain entities 170, and computer 180 using network 190 or in any other appropriate manner. Those skilled in the art will recognize that the complete structure and operation of network 190 and other components within supply chain network 100 are not depicted or described. Embodiments may be employed in conjunction with known communications networks and other components.

In accordance with the principles of embodiments described herein, supply chain planner 150 may generate a supply chain plan. Furthermore, one or more computers 180 associated with transportation network 120, warehouse management system 130, inventory system 140, and supply chain planner 150 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 170, and the configuration and quantity of packaging and shipping of items based on a supply chain plan, one or more tasks, actions, and scenarios generated by one or more users and which may be used to generate or modify the supply chain plan, the number of items currently in stock at one or more supply chain entities 170, the number of items currently in transit in transportation network 120, a forecasted demand, a supply chain disruption, a material or capacity reallocation, current and projected inventory levels at one or more stocking locations, and/or one or more additional factors described herein. For example, the methods described herein may include computers 180 receiving product data 254 from automated machinery having at least one sensor and product data 254 corresponding to an item detected by the automated machinery. The received product data 254 may include an image of the item, an identifier, as described above, and/or product information associated with the item, including, for example, dimensions, texture, estimated weight, and the like. Computers 180 may also receive, from one or more sensors 162 of one or more networked imaging devices 160, a current location of the identified item.

Figure 2:
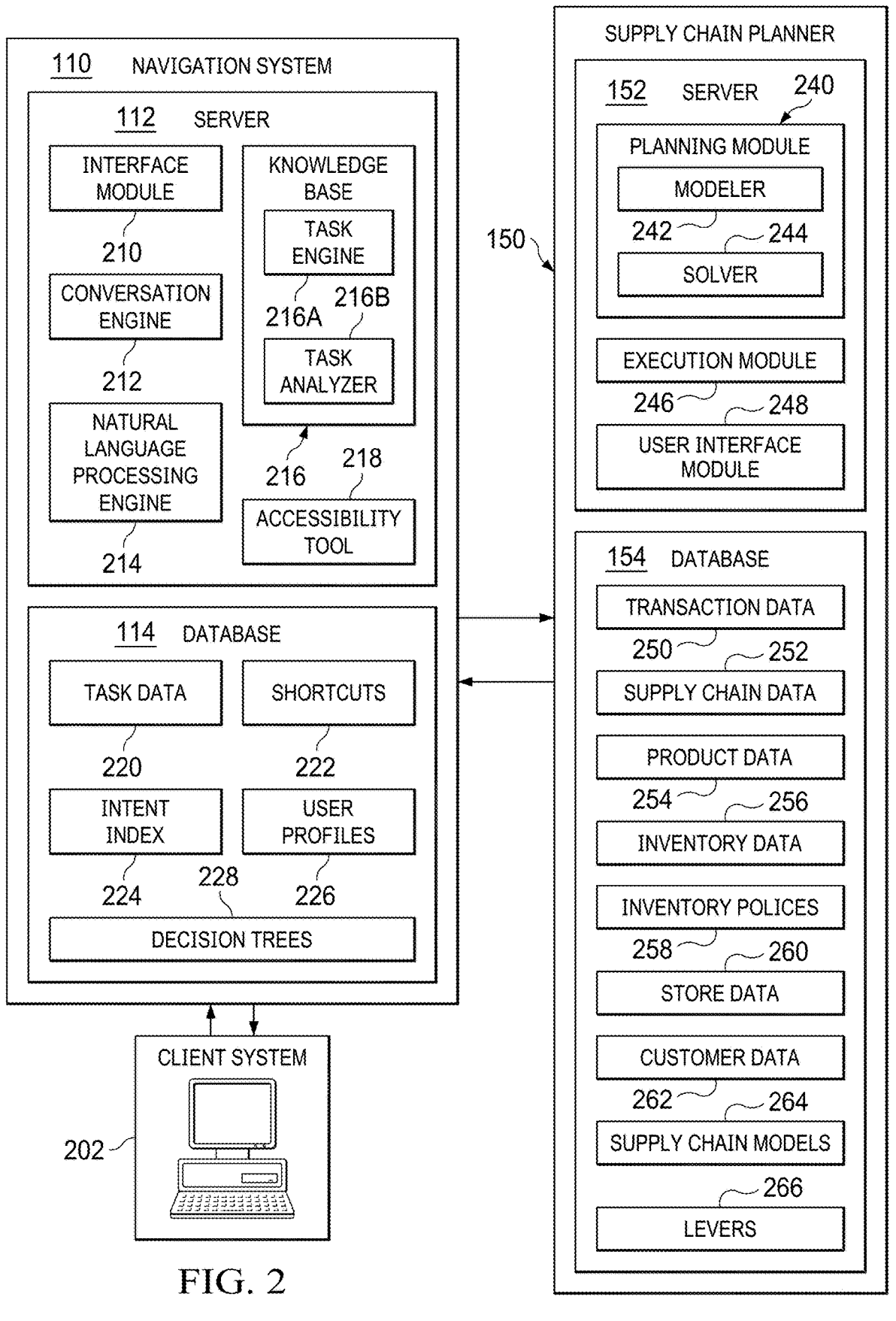
FIG. 2 illustrates the client system and the navigation system and the supply chain planner of FIG. 1 in greater detail, in accordance with an embodiment.

FIG. 2 illustrates client system 202 and navigation system 110 and supply chain planner 150 of FIG. 1 in greater detail, in accordance with an embodiment. Client system 202 comprises one or more computers 180, as disclosed above. According to some embodiments, client system 202 comprises a thick client, such as, for example, a software application, compiled and running on a computer or server. According to other embodiments, the client comprises a thin client, such as, for example, code executed by a webpage within a web browser. According to some embodiments, the client comprises a hybrid client comprising features of both thick and thin clients. Client system 202 is configured to display the GUI of navigation system 110, receive user inputs 502, transmit user inputs 502 to navigation system

110, transportation network 120, warehouse management system 130, inventory system 140, or supply chain planner 150, and request and receive information from navigation system 110, transportation network 120, warehouse management system 130, inventory system 140, and supply chain planner 150, as described in further detail below.

Navigation system 110 comprises server 112 and database 114, as disclosed above. Although navigation system 110 is shown as comprising a single server 112 and a single database 114, embodiments contemplate any suitable number of servers 112 or databases 114 internal to or externally coupled with navigation system 110.

Server 112 of navigation system 110 comprises interface module 210, conversation engine 212, NLP engine 214, knowledge base 216, and accessibility tool 218. Although server 112 is shown and described as comprising a single interface module 210, a single conversation engine 212, a single NLP engine 214, a single knowledge base 216, and a single accessibility tool 218, embodiments contemplate any suitable number or combination of these located at one or more locations, local to, or remote from navigation system 110, such as on multiple servers or computers at one or more locations in supply chain network 100.

Interface module 210 generates a multi-level navigable interactive GUI. According to one embodiment, interface module 210 displays text and graphical elements to navigate the actions needed to perform tasks associated with roles of one or more workers. In addition, interface module 210 may further cause the GUI to display text or graphics that respond or answer a question, display an analytic that explains choices between answers to a question, a graphical element comprising a single object, a graphical element comprising an object list, a list with choices, or a guided procedure comprising any number of one or more actions, which may comprise one or steps of one or more tasks, according to particular needs. Interface module 210 provides for initiating actions based on the messages processed by conversation engine 212.

Conversation engine 212 comprises conversation engine 212 of FIG. 3 (such as, for example, a chatbot interface) for sending and receiving messages and displaying the incoming and outgoing messages, as described in further detail below.

NLP engine 214 implements natural language phrases related to information needs, user input 502, initiating tasks and actions, and the like. In one embodiment, conversation engine 212 transmits voice- and text-based user inputs 502 to NLP engine 214, such as, for example, a third-party natural language processing system (such as, for example, GOOGLE Dialogue Flow or MICROSOFT Bot Framework) and receives the intent mapped to the natural language input. According to embodiments, natural language processing system interprets user input 502 according to one or more meta-classes such as, for example, RECOGNIZE <specific information>, OVERVIEW <data set>, SELECT <option>, ENTER <content>, INITIATE <execution of service>, and/ or the like. By way of example only and not by way of limitation, identifying a user intent according to the RECOGNIZE meta-class comprises identifying a single value, face or item and providing by an output device, a name, value, fact, or the like. In addition, or as an alternative, an OVERVIEW meta-class comprises identifying a dataset or collection of items and providing by an output device, a list of items or datasets, a summary statement of the items or data sets, a first item or a predetermined number of items or datasets, a list of tasks, actions, navigations, and the like. According to embodiments, a SELECT meta-class comprises selecting an existing item or value and providing for an input to displayed or predetermined list or dataset, a selection from a list of options (including a dynamic list of options), and the like. Embodiments contemplate an ENTER meta-class that identifies user-defined content within the natural language input and provides for entry of user-input according to the interpretation by the natural language system. Embodiments of the INITIATE meta-class comprises executing a service, which may include executing a service according to one or more parameters identified in the natural language input. As described in further detail below, the intent of the natural language input may be interpreted according to the complexity of the response, wherein the complexity of the response may be based on the quantity, richness, or other quality of the data. According to an embodiment, intents determined according to the RECOGNIZE, ENTER, and INITIATE meta-classes may comprise a low-complexity. In addition, or as an alternative, intents determined according to the OVERVIEW and SELECT meta-classes comprise difficult or high-complexity. As described in further detail below, conversation engine 212 of the GUI displays based, at least in part, on the intent and a complexity of the natural language input.

According to embodiments, knowledge base 216 of navigation system 110 stores a searchable index of definitions which define the task associated with each intent. In addition, or as an alternative, knowledge base 216 may comprise the entities and slots provided at particular actions for a task, and the number of activities (or steps) or decision tree to complete the task. As described in further detail below, knowledge base 216 comprises task engine 216A and task engine 216B. Task engine 216A identifies tasks in access portal 302, GUI, or other application, indexes the tasks, and ranks tasks based, at least in part, on their matching with a user intent. Task engine 216B fetches the task most relevant to the user intent and determines the steps to complete the task and the slots or entities provided at each step.

Accessibility tools 218 provide screen reading, key tap, talk back, or other accessibility options for specially-abled users. In addition, power users may also rely on similar accessibility tools 218 that address the problem of information overload and accessibility.

Database 114 of navigation system 110 may comprise one or more databases or other data storage arrangement at one or more locations, local to, or remote from, server 112. Database 114 of navigation system 110 comprises, for example, task data 220, shortcuts 222, intent index 224, user profiles 228, and decision trees 230. Although database 114 of navigation system 110 is shown and described as comprising task data 220, shortcuts 222, intent index 224, user profiles 228, and decision trees 230, embodiments contemplate any suitable number or combination of these, located at one or more locations, local to, or remote from, navigation system 110 according to particular needs.

In one embodiment, task data 220 comprises an index of the actions and roles associated with each task. In addition, the tasks are associated with intents which are used by NLP engine 214 to identify tasks from a natural language input and to provide responsive language displayed by conversation engine 212.

Shortcuts 222 comprise hotkey or keyboard shortcuts 1110 for initiating an action or navigation. As described in further detail below, the user interface displays shortcuts 222 based on the context associated with the current and previous states of user, the system interface, and decision trees 230. Navigation shortcuts 222 provide, for example, navigating from a current zone or location of the user interface to the location or zone associated with the executed shortcut.

According to embodiments, intent index 224 is used by natural language processing engine 214 to assign the closest-matching intents to speech or text inputs received from one or more users. The intents are categorical assignments that describe the purpose or goal of the natural language input. One or more alternative phrases may be mapped to the same intent.

User profiles 228 comprise data identified about a user interest domain, as described in further detail below. User profiles 228 may relate to a certain role of users, such as an admin or a planner, for example, or may relate to a particular user.

Decision trees 230 visually represent decisions and decision making of supply chain planning and execution processes. Decision trees 230 comprise a number of nodes representing possible steps, or decisions, which could be taken in supply chain network 100. The nodes of decision trees 230 comprise activities a user may perform in the supply chain, such as producing a demand forecast for retail location, producing a supply chain plan, adding or editing a planogram, or any other possible supply chain activities.

As disclosed above, supply chain planner 150 may comprise server 152 and database 154. Although supply chain planner 150 is shown as comprising a single server 152 and a single database 154, embodiments contemplate any suitable number of servers 152 or databases 154 internal to or externally coupled with supply chain planner 150.

Server 152 of supply chain planner 150 comprises planning module 240, execution module 246, and user interface module 248. Although server 152 is shown and described as comprising a single planning module 240, a single execution module 246, and a single user interface module 248, embodiments contemplate any suitable number or combination of planning modules 240, execution modules 246, and user interface modules 248, located at one or more locations, local to, or remote from supply chain planner 150, such as on multiple servers or computers at one or more locations in supply chain network 100.

Database 154 of supply chain planner 150 may comprise one or more databases or other data storage arrangement at one or more locations, local to, or remote from, server 152. Database 154 of supply chain planner 150 comprises, for example, transaction data 250, supply chain data 252, product data 254, inventory data 256, inventory policies 258, store data 260, customer data 262, supply chain models 264, and levers 266. Although database 154 of supply chain planner 150 is shown and described as comprising transaction data 250, supply chain data 252, product data 254, inventory data 256, inventory policies 258, store data 260, customer data 262, supply chain models 264, and levers 266, embodiments contemplate any suitable number or combination of data, located at one or more locations, local to, or remote from, supply chain supply chain planner 150, according to particular needs.

Planning module 240 comprises modeler 242 and solver 244. Although planning module 240 is shown and described as comprising a single modeler 242 and solver 244, embodiments contemplate any suitable number or combination of these located at one or more locations, local to, or remote from planning module 240, such as on multiple servers or computers at any location in supply chain network 100.

Modeler 242 may model one or more supply chain planning problems of supply chain network 100. According to one embodiment, modeler 242 of server 152 identifies resources, operations, buffers, and pathways, and maps supply chain network 100 using supply chain network models, as disclosed above. For example, modeler 242 of server 152 models a supply chain planning problem that represents supply chain network 100 as a supply chain network model, an LP optimization problem, or other type of input to a supply chain solver 244. As disclosed above, embodiments contemplate modeler 242 providing a supply chain network model to navigation system 110.

According to embodiments, solver 244 of planning module 240 generates a solution to a supply chain planning problem. The supply chain solver 244 may comprise an LP optimization solver, a heuristic solver, a mixed-integer problem solver, a MAP solver, an LP solver, a Deep Tree solver, and the like. According to some embodiments, solver 244 solves a supply chain planning problem.

Execution module 246 executes one or more supply chain processes such as, for example, instructing automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 170, and the configuration and quantity of packaging and shipping of items based on a supply chain plan, the number of items currently in stock at one or more supply chain entities 170, the number of items currently in transit in transportation network 120, a forecasted demand, a supply chain disruption, a material or capacity reallocation, current and projected inventory levels at one or more stocking locations, a selected lever, and/or one or more additional factors described herein. For example, execution module 246 may send instructions to the automated machinery to locate items to add to or remove from an inventory of or shipment for one or more supply chain entities 170.

User interface module 248 of supply chain planner 150 generates and displays a UI, such as, for example, a GUI, that displays one or more interactive visualizations of transaction data 250, supply chain data 252, product data 254, inventory data 256, inventory policies 258, store data 260, customer data 262, supply chain models 264, and levers 266. According to embodiments, user interface module 248 displays a GUI comprising interactive graphical elements for selecting one or more supply chain network 100 components, modeling supply chain network 100 as an object model, formulating supply chain network 100 as a supply chain planning problem, solving the supply chain planning problem, displaying and providing for selection of one or more levers 266, and displaying one or more solutions or supply chain plans.

Transaction data 250 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 250 is represented by any suitable combination of values and dimensions, aggregated or un-aggregated, such as, for example, sales per week, sales per week per location, sales per day, sales per day per season, or the like.

Supply chain data 252 may comprise any data of one or more supply chain entities 170 including, for example, item data, identifiers, metadata (comprising dimensions, hierarchies, levels, members, attributes, cluster information, and member attribute values), fact data (comprising measure values for combinations of members) of one or more supply chain entities 170. Supply chain data 252 may also comprise for example, various decision variables, business constraints, goals, and objectives of one or more supply chain entities 170. According to some embodiments, supply chain data 252 may comprise hierarchical objectives specified by, for example, business rules, master planning requirements, scheduling constraints, and discrete constraints, including, for example, sequence dependent setup times, lot-sizing, storage, shelf life, and the like.

Product data 254 of database 154 may comprise products identified by, for example, a product identifier (such as a Stock Keeping Unit (SKU), Universal Product Code (UPC) or the like), and one or more attributes and attribute types associated with the product ID. Product data 254 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 256 of database 154 may comprise any data relating to current or projected inventory quantities or states, order rules, or the like. For example, inventory data 256 may comprise the current level of inventory for each item at one or more stocking points across supply chain network 100. In addition, inventory data 256 may comprise order rules that describe one or more rules or limits on setting an inventory policy, including, but not limited to, a minimum order volume, a maximum order volume, a discount, and a step-size order volume, and batch quantity rules. According to some embodiments, supply chain planner 150 accesses and stores inventory data 256 in database 154, which may be used by supply chain planner 150 to place orders, set inventory levels at one or more stocking points, initiate manufacturing of one or more components, or the like in response to, and based at least in part on, a supply chain plan or other output of supply chain planner 150. In addition, or as an alternative, inventory data 256 may be updated by receiving current item quantities, mappings, or locations from the transportation network 120, warehouse management system 130, inventory system 140, supply chain planner 150 and/or one or more networked imaging devices 160.

Inventory policies 258 of database 154 may comprise any suitable inventory policy describing the reorder point and target quantity, or other inventory policy parameters that set rules for supply chain planner 150 to manage and reorder inventory. Inventory policies 258 may be based on target service level, demand, cost, fill rate, or the like. According to embodiment, inventory policies 258 comprise target service levels that ensure that a service level of one or more supply chain entities 170 is met with a certain probability. For example, one or more supply chain entities 170 may set a service level at 95%, meaning one or more supply chain entities 170 will set the desired inventory stock level at a level that meets demand 95% of the time. Although, a particular service level target and percentage is described; embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, navigation system 110 and/or supply chain planner 150 may determine a replenishment order according to one or more replenishment rules, which, among other things, indicates to one or more supply chain entities 170 to determine or receive inventory to replace the depleted inventory. By way of example and not of limitation, an inventory policy for non-perishable goods with linear holding and shorting costs comprises a min./max. (s,S) inventory policy. Other inventory policies 258 may be used for perishable goods, such as fruit, vegetables, dairy, fresh meat, as well as electronics, fashion, and similar items for which demand drops significantly after a next generation of electronic devices or a new season of fashion is released.

Store data 260 may comprise data describing the stores of one or more retailers and related store information. Store data 260 may comprise, for example, a store ID, store description, store location details, store location climate, store type, store opening date, lifestyle, store area (expressed in, for example, square feet, square meters, or other suitable measurement), latitude, longitude, and other similar data. Store data 260 may include demand forecasts for each store indicating future expected demand based on, for example, any data relating to past sales, past demand, purchase data, promotions, events, or the like of one or more supply chain entities 170. The demand forecasts may cover a time interval such as, for example, by the minute, hour, daily, weekly, monthly, quarterly, yearly, or any suitable time interval, including substantially in real time. Although demand forecasts are described as comprising a particular store, supply chain planner 150 may calculate a demand forecast at any granularity of time, customer, item, region, or the like.

Customer data 262 may comprise customer identity information, including, for example, customer relationship management data, loyalty programs, and mappings between one or more customers and transactions associated with those one or more customers such as, for example, product purchases, product returns, customer shopping behavior, and the like. Customer data 262 may comprise data relating customer purchases to one or more products, geographical regions, store locations, time period, or other types of dimensions.

Supply chain models 264 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 264 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model. Levers 266 comprise user-selectable interventions that may adjust cost, timing, quantity, speed, percentage, KPIs, or other measured value that reflects a performance or quality of a supply chain process. For example, a lever for a demand planner may comprise changing the delivery method to air from ground, when a percentage-on-time is lower than a threshold value in order to avoid late shipments.

Figure 3:
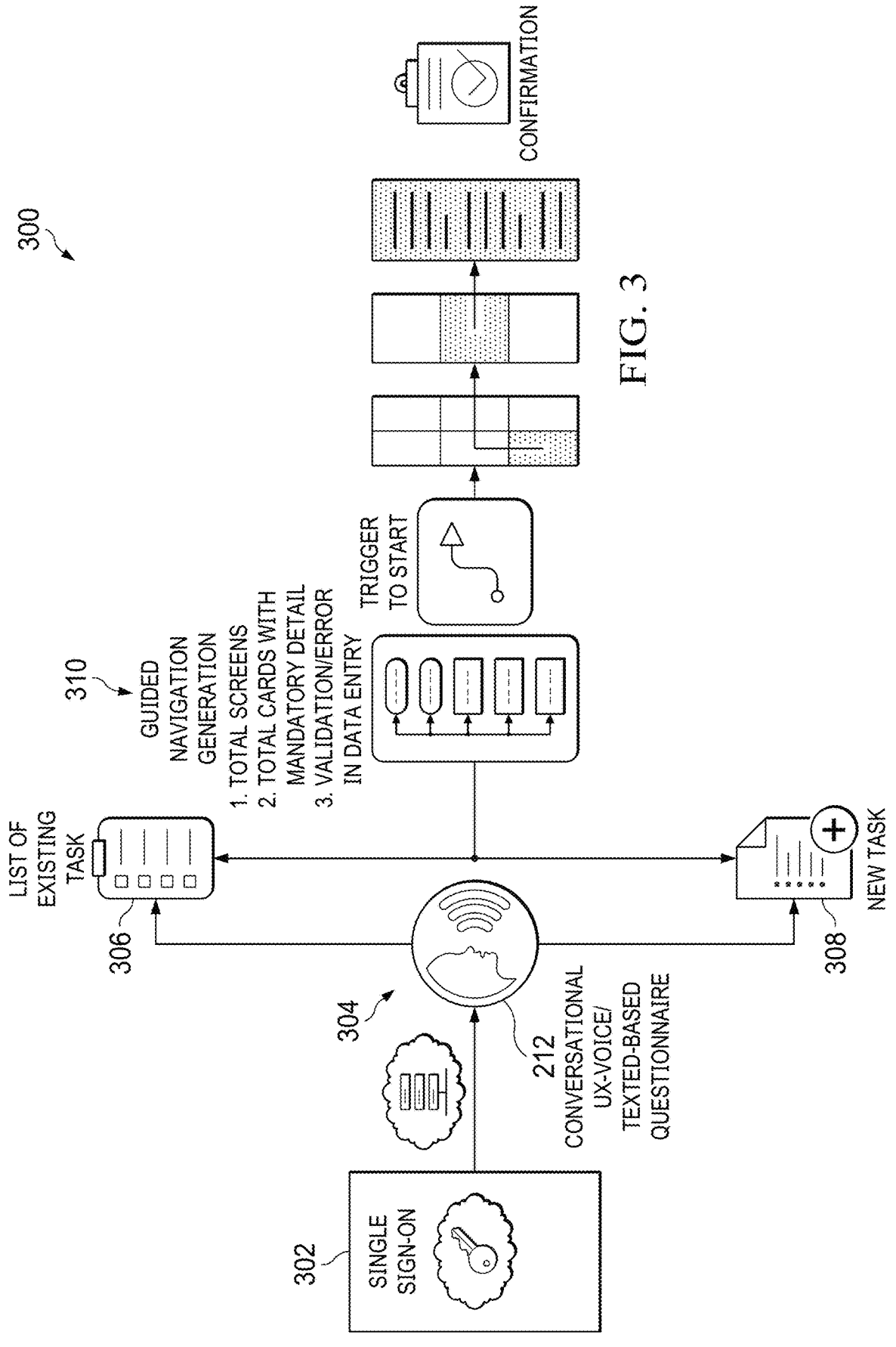
FIG. 3 illustrates a guided navigation process, according to an embodiment.

FIG. 3 illustrates guided navigation process 300, according to an embodiment. Guided navigation process 300 comprises one or more activities using one or more modules of navigation system 110, which although described in a particular order may be implemented in one or more combinations, according to particular needs. At activity 302, navigation system 110 uses an access portal that provides a user access to the GUI of navigation system 110. In embodiments, the access portal is a single sign-on portal. At activity 304, the access portal provides access to conversation engine 212 of the GUI, which allows performing role-related work tasks for transportation network 120, warehouse management system 130, inventory system 140, and supply chain planner 150. The access portal and the user interface may be coupled with network 190 using one or more communications links 191-198, which may be any wireline, wireless, or other link suitable to support data communications between access portal 302, conversation engine 212, and network 190 during operation of supply chain network 100. According to embodiments, conversation engine 212 uses voice or text-based interaction to select one or more displayed elements (e.g., selecting a task from a task list at activity 306), initiate an action or a new task at activity 308, and/or provide guided navigation at activity 310 to task completion, as described in further detail below.

Figure 4:
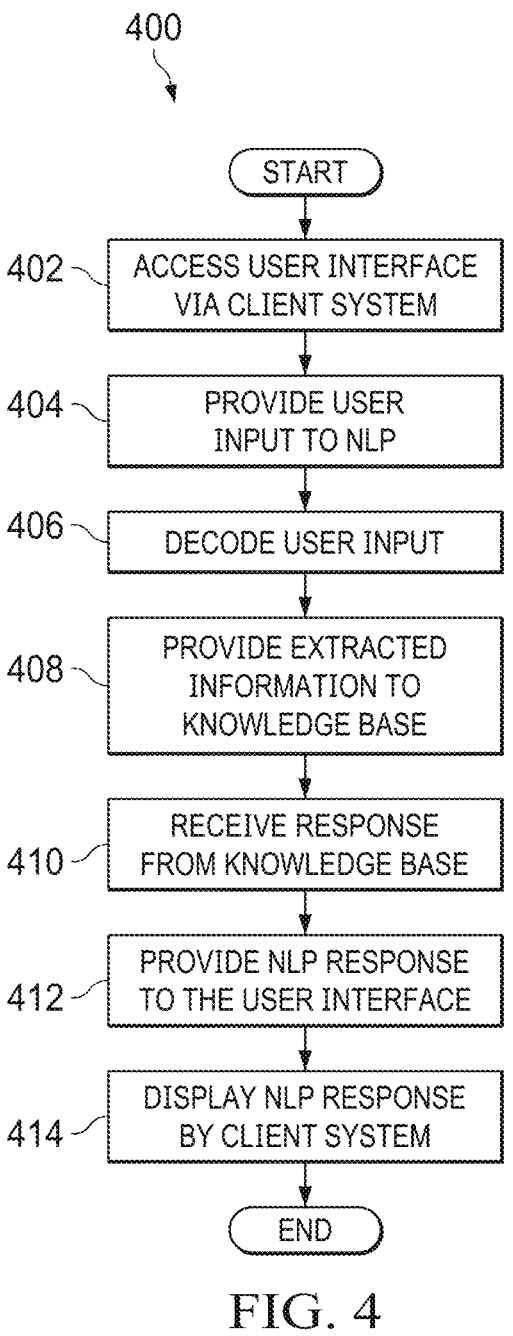
FIG. 4 illustrates the method of responding to requests using the conversation interface, according to an embodiment.

FIG. 4 illustrates method 400 of responding to requests using conversation engine 212, according to an embodiment. Method 400 comprises one or more activities, which although described in a particular order may be implemented in one or more combinations, according to particular needs. Method 400 may begin at activity 402 by accessing the GUI via access portal 302 of the client. In one embodiment, access portal 302 comprises software, hardware, or both located local to, or remote from, a client system 202 and which provides user access to the GUI.

At activity 404, conversation engine 212 provides user input 502 to natural language processing (NLP) engine 214. Conversation engine 212 may display a task list 306, available services (such as, for example a chatbot), tools, utilities, and the like. In one embodiment, a user may provide a natural language user input 502 comprising voice or text to conversation engine 212. By way of example only and not by way of limitation, a user may generate a query to conversation engine 212 related to defined events of a fulfilment manager and comprising, "What are the exceptions with my committed orders for a Medicine market in the northeast region?"

At activity 406, NLP engine 214 decodes user input 502. According to embodiments, decoding the natural language user input 502 comprises determining the intent of the input and any additional information relevant to the intent. Embodiments contemplate NLP engine 214 being context aware such that the intent is determined further according to a context associated with the natural language input, such as, for example, a list of recent tasks associated with the user providing the input, the role of the user, the time when the input was received, the current data displayed on the GUI, a previous user input 502, a goal or result of a task, a list of currently assigned or open tasks, and the like. Continuing with the previous example of the query related to the healthcare market in the northeast region for the fulfillment manager, NLP engine 214 decodes the intent as "view order's exceptions" and the following entities/slots:

Order type: Committed
Market segment: Medicine, healthcare
Location: Northeast region
Owner: Pankaj R At activity 408, NLP engine 214 provides the extracted information to knowledge base 216 and, at activity 410, receives the response. In one embodiment, navigation system 110 searches knowledge base 216 for the definition of the intent extracted from the natural language input NLP engine 214. As disclosed above, knowledge base 216 may store a searchable index of definitions associated with intents that the system is able to decode from the natural language input. The definitions for the intents may be associated with any task, action, service, navigation, or function of the user interface or its applications. The definitions may provide available or required parameters, syntax, available or required slots or entities, number of steps 604 or activities, modifications, or the like that may be decoded from the natural language input with the intent. By way of example only and not by way of limitation, knowledge base 216 may store definitions which define the task associated with each intent, the entities and slots that are needed or available to provide inputs during the task, modifications or parameters for the task, and the number of activities (or steps) to complete the task.

At activity 412, NLP engine 214 provides the natural language response to conversation engine 212 for display by the GUI to the user, at activity 414. According to some embodiments, the response generated by NLP engine 214 comprises number of steps 604 and missing slots 606 or entities needed to complete the task. In addition, or in the alternative, NLP engine 214 may generate a response comprising a confirmation that a task associated with the intent is already completed, an action associated with the intent is being executed or cannot be executed, or any other suitable response to the identified user intent, according to particular needs.

Figure 5:
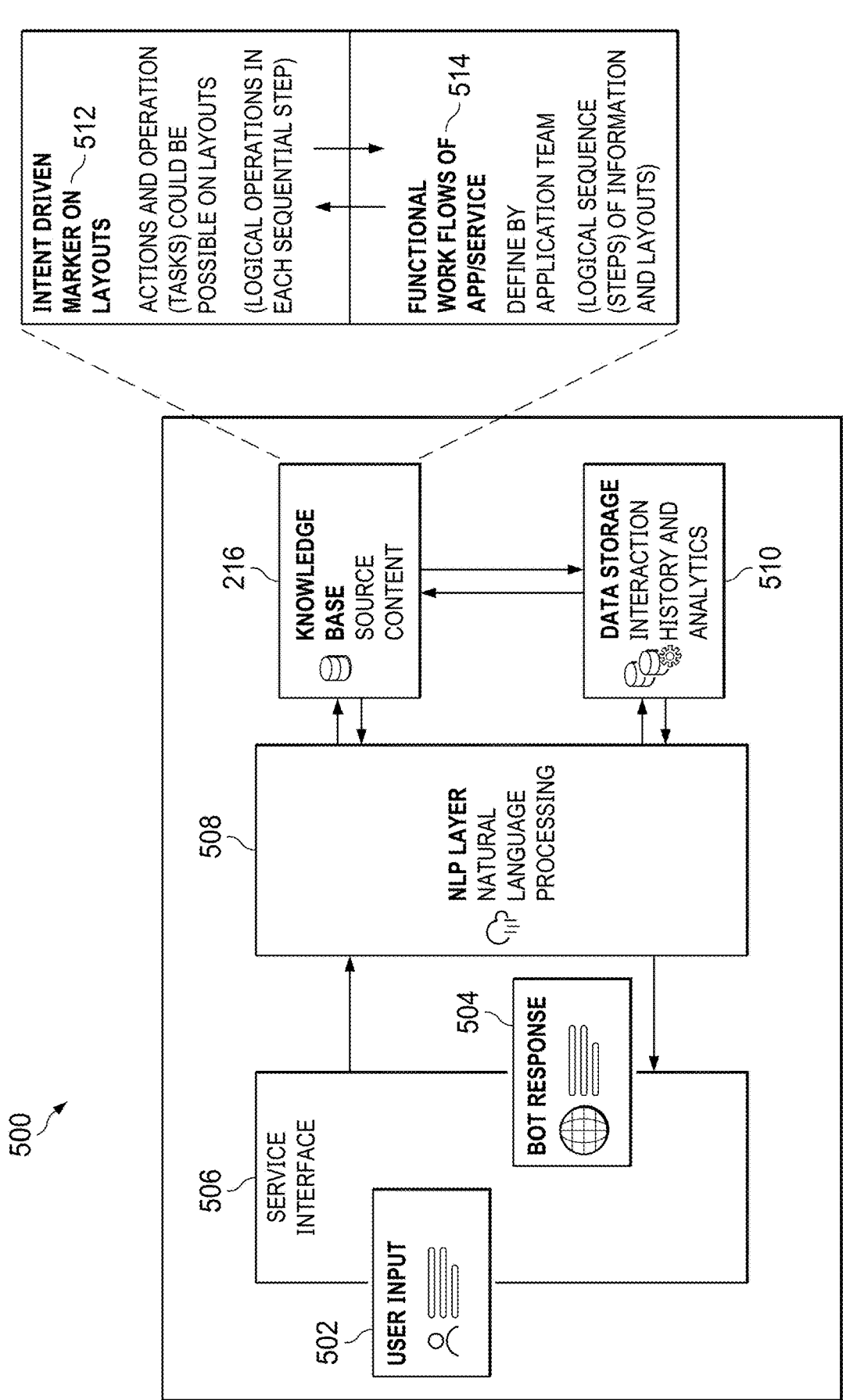
FIG. 5 illustrates a block diagram representing the flow of data from a user input to a chat bot response, according to an embodiment.

FIG. 5 illustrates block diagram 500 representing the flow of data from user input 502 to chat bot response 504, according to an embodiment. Block diagram 500 comprises service interface 506 (conversation engine 212 of interface module 210), NLP layer 508 (NLP engine 214), knowledge base 216, and data storage location 510 (such as, for example, database 114 of navigation system 110) comprising interaction history and analytics. In one embodiment, service interface 506 generated by user interface module 248 interacts with the user using text or voice-based natural language interactions that comprise receiving natural language user input 502 and generating natural language responses. As disclosed above, conversation engine 212 comprises a chatbot that receives natural language from user input 502 and generates bot response 504 comprising a natural language reply to user input 502.

NLP layer 508 performs natural language processing using NLP engine 214 to decode user input 502 by extracting utterances, intents, entities, slots, selections, or other indication or meaning from the natural language input and providing the extracted data to knowledge base 216, data storage location 510, navigation system 110, transportation network 120, warehouse management system 130, inventory system 140, supply chain planner 150, client system 202, or other locations local to, or remote from, supply chain network 100. NLP engine 214 receives responses from the one or more locations and transforms the responses into natural language bot responses 504 displayed by conversation engine 212.

Data storage location 510 (such as, for example, database 114 of navigation system 110) stores the interaction history and analytics, which are used by the intelligent navigation method to apply learning and statistics when selecting navigations and actions, as described in further detail below.

As described above, knowledge base 216 comprises intent-driven marker 512 on layouts which comprises actions and operations (tasks) that are possible on layouts and logical operations in each sequential step. For the client portal comprising a card-based design, navigation system 110 comprises defined page patterns with dedicated zones to utilities or services as scope, filters, collaboration, and the like. Intent-driven markers 512 comprise graphical elements (such as underlined initials) on cards based on the intent of a user to easily see and use a keyboard shortcut to jump and/or focus on the identified card. These markers may comprise accelerators for keyboard accessibility of layouts.

In addition, or as an alternative, knowledge base 216 comprises functional workflows 514 for an application or service that are defined by the application and may comprise a logical sequence of actions (activities or steps) of information and layouts, as disclosed in further detail below. For example, functional workflow 514 may comprise, in any service (such as, for example, assortment planning), the operations and tasks that are coupled with a business objective and functions of one or more features. By way of example only and not by way of limitation, functional workflow 514 for assortment planning may comprise creating a first assortment activity by a user, reviewing and approving the first assortment by a second user (such as, for example, a manager), adding a store, products, and detail to the assortment by the first user or a third user, and performing other tasks and activities by other one or more users related to this or other functional workflows 514.

Figure 6:
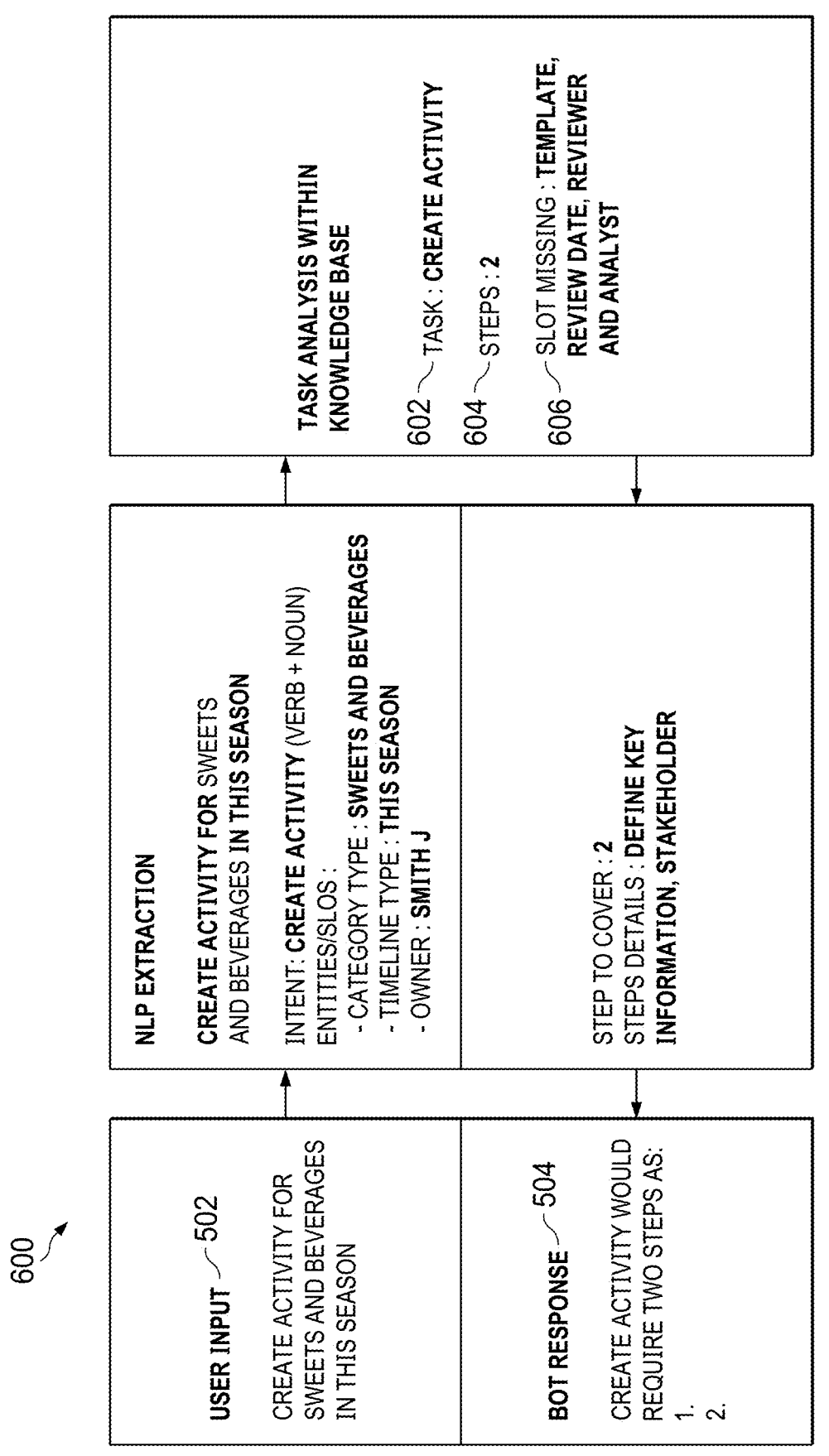
FIG. 6 illustrates a simplified example of the user input and the bot response using the navigation system, disclosed above.

FIG. 6 illustrates a simplified example 600 of user input 502 and bot response 504 using navigation system 110, disclosed above. In this example, user input 502 received by conversation engine 212 comprises a natural language input comprising "create activity for sweets and beverages in the current season." NLP layer 508 extracts the intent (initiate the create activity task) and entities/slots associated with intent, such as, for example, category type (sweets and beverages), timeline type (current season), and owner (current user, Pankaj R). Knowledge base 216 then performs task analysis to determine that the create activity task requires two steps, and three slots are missing from the natural language input. NLP engine 214 receives task identity 602, number of steps 604 needed, and missing slots 606 from knowledge base 216. The NLP determines that two steps are needed to cover the task and that the steps details require defining key information and the stakeholder. Conversation engine 212 receives the steps to cover quantity and the steps details from NLP engine 214 and generates a response (bot response 504) in a natural language format that explains that the create activity task requires two steps and provides a prompt for the user to execute guided navigation 310 from the GUI to complete the remaining steps and input any missing slots 606.

FIG. 7 illustrates workflow 700 between task engine 216A and task engine 216B of knowledge base 216, according to an embodiment. As disclosed above, knowledge base 216 may comprise task engine 216A and task engine 216B. Task engine 216A crawls the tasks associated to a user in access portal 302, GUI, or application, indexes the tasks by, for example, storing and organizing task definitions according to the one or more intents that initiate the task. In addition, embodiments of task engine 216A rank tasks according to how well they correspond with a user intent. By way of example only and not by way of limitation, after a user logs in through the client portal), task engine 216A generates a list of tasks by crawling the tasks associated with a particular user (e.g., a history of usage and responsibilities) and portal (e.g., other tasks the client portal and applications may support). Task engine 216A may then index the tasks according to user intent. In one example, a user may query to show all the orders, and, in response and based, at least in part, on the user, task engine 216A indexes the tasks available to the user and which are related to orders in the application's context, followed by sharing the most relevant tasks and/or actions associated to the user's intent.

Task engine 216B fetches the task most relevant to the user intent and determines number of steps 604 to complete the task and the slots or entities used by the task at each step. Continuing with the previous example of a category assortment planner and a create activity, the task analyser determines that this would require two steps: first to select category and subcategories (slots); and second to define details related to reviewers, analyst (slots), and the like.

Figure 8:
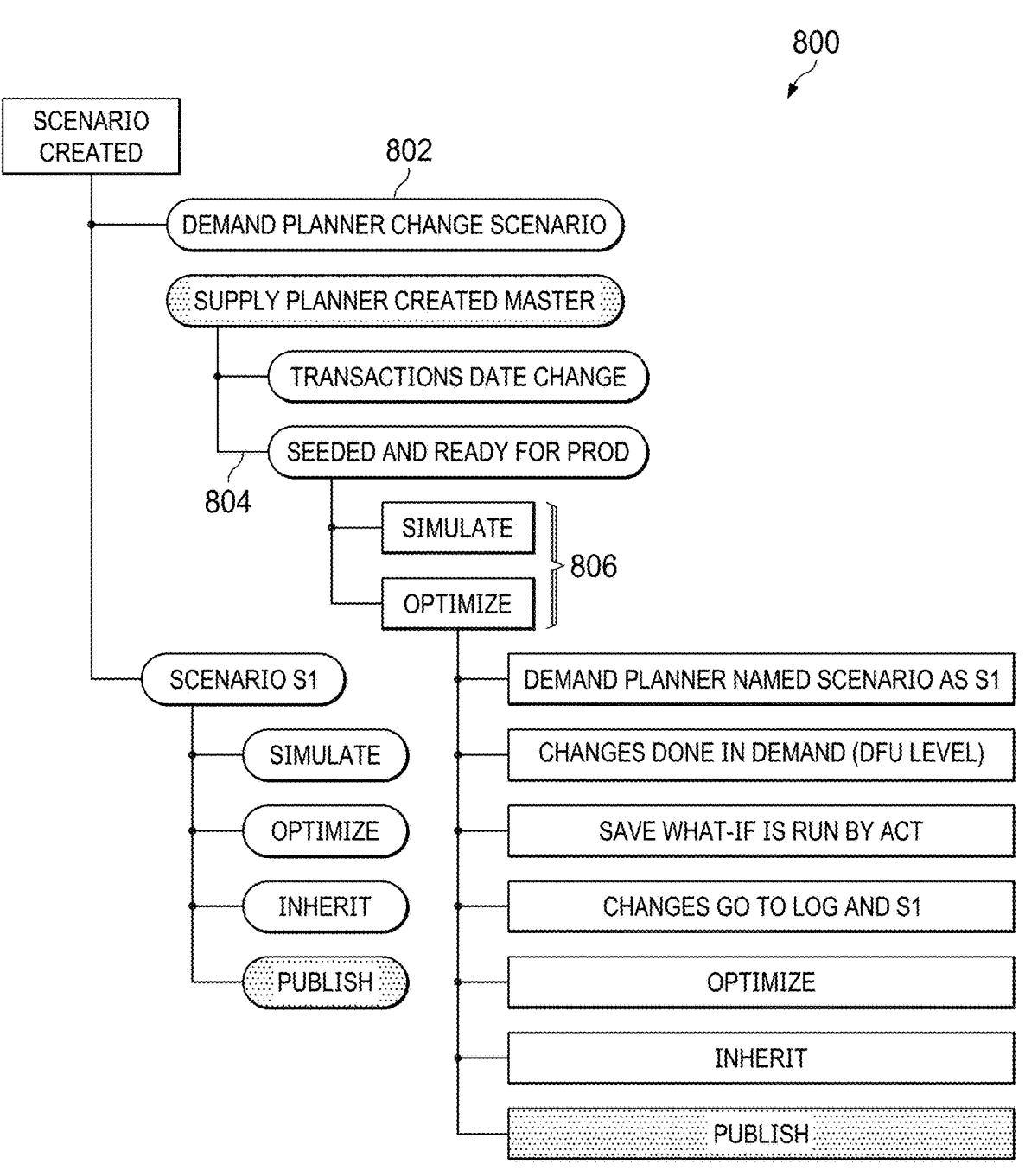
FIG. 8 illustrates scenario creation task information navigational flow 800, according to an embodiment

FIG. 8 illustrates scenario creation task information navigational flow 800, according to an embodiment. Information navigational flows, such as scenario creation task information navigational flow 800, map the flow of information through applications or solutions controlling transportation network 120, warehouse management system 130, inventory system 140, and supply chain planner 150. Nodes 802 of information navigational flows correspond to data locations, functions, actions, layouts, screens, and/or modules which a user may view and perform tasks related to. Arcs 804 connecting nodes 802 indicate available or potential navigational paths from each node 802. In addition, or as an alternative, navigations may comprise jumping, canceling, or choosing another path using side (and/or predefined portal) navigations.

Each of nodes 802 and arcs 804 are located in one or more levels 806 of a hierarchy which may correspond to organization of the GUI. Although scenario creation task information navigational flow 800 is shown as comprising a particular number and configuration of nodes 802, arcs 804, and levels 806, embodiments contemplate information navigational flows having any number and configuration of nodes 802, arcs 804, and levels 806 for an interface visualization of any transportation network 120, warehouse management system 130, inventory system 140, supply chain planner 150, or any system accessed through a user interface, according to particular needs.

Scenario creation task information navigational flow 800 comprises nodes 802 connected by arcs 804 organized in one or more levels 806 of a hierarchy, as disclosed above. This example illustrates the complexity of navigating between locations of the actions needed to complete even a single task, here, an example scenario creation task. In addition, completing these tasks is further impeded by the crowded and data-rich supply chain planning user interfaces that require excessive navigation and clicking, each of which may be followed by visual or audio feedback, further distracting and impeding user productivity. Navigation system 110 may be used with, for example, supply chain planner 150 for an apparel retailer, a warehouse manager, a transportation manager, and the like. In each of these example scenarios, the planner or manager may accomplish tasks by navigating and performing actions along a particular path of scenario creation task information navigational flows 900 or one or more decision trees 230.

As disclosed above, some specially-abled users may rely on one or more plugins that provide screen reading, key tap, talk back, or other accessibility options. In addition, power users may also rely on plugins that address the problem of information overload and accessibility. To overcome the limitations of these plugins, navigation system 110 identifies a predefined or formulated task from a user intent. Navigation system 110 generates a potential navigation in a context-specific manner, such as, for example, based, at least in part on, user profiles 228, historical navigation, current location within the interface, currently displayed data, and the like.

To complete a task, the user may be required to generate user inputs 502 to the user interface to execute a task at one level of the hierarchy, navigate to a node in a different level of the hierarchy, perform an action at the node, navigate to a second node (which may be in the same or different level of the hierarchy), perform an action at the second node, and iteratively perform actions and navigations until all steps of the task are completed. Even for the simplified examples of the information navigational flow for a GUI displaying a category management application or a scenario creation task, completing tasks requires complex or excessive navigations. Notably, most transportation networks 120, warehouse management systems 130, inventory systems 140, and supply chain planners 150 comprise a navigation informational flow much larger and more complex than the simplified category management and scenario creation task examples provided above.

To improve navigation, in some embodiments, navigation system 110 provides hotkeys or keyboard shortcuts for navigation and actions. Hotkey or keyboard shortcuts 1110 for navigations are executed by user input 502 of hotkey or keyboard shortcut 1110, and, in response to user input 502, the user interface moves a cursor or current selection (such as a current selection of an object of the GUI). Although navigations are shown and described as changing the selection in the GUI, from the currently-selected object to an object in a different location, such as, for example, locations of a single zone, between locations of two or more zones, of one zone to another zone, or between or among any number of locations within the GUI, according to particular needs.

Figure 9:
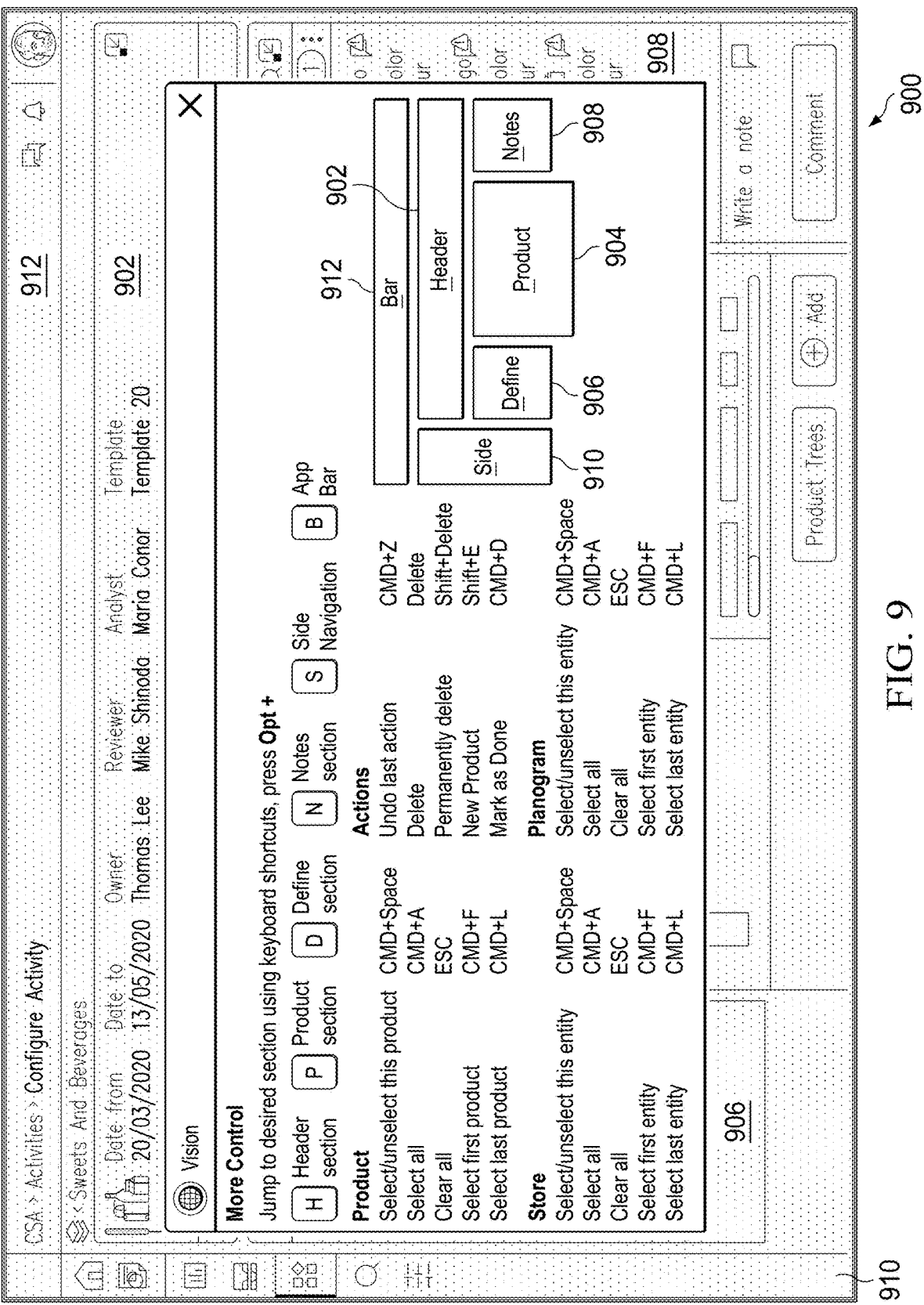
FIG. 9 illustrates an example layout for an interface having a card-based design, according to an embodiment.

FIG. 9 illustrates example layout 900 for an interface having a card-based design, according to an embodiment. Example layout 900 comprises the following zones: header section 902, product section 904, define section 906, notes section 908, side navigation 910, and app bar 912. Although example layout 900 is shown and described as comprising a particular number and arrangement of zones, embodiments contemplate any suitable arrangement or number of these or other zones, according to particular needs.

FIG. 10 illustrates card-based interface design 1000, according to an embodiment. As disclosed above, the card-based design divides the user interface into different zones. However, based on the amount of information presented, navigating from one zone to another zone using a screen reader will be distractingly noisy based on the large amount of text and graphical elements located in the various zones. In the illustrated embodiment, header section 902 defines activities and information; products section 904, allows the user to display, edit, select, create, the available products; define section 906 defines the scope product section 904, which may be, for example, stores, planograms, performance data, or products. By way of example only and not by way of limitation, a keyboard shortcut (such as, for example, navigating between elements using a tab key of a keyboard) requires more than twenty user inputs to navigate from the sweets and beverages header 902 to notes section 908. When a screen reader or other accessibility tool 218 is active, navigation using a tab key or arrow key causes computer 180 to generate a droning noise caused by reading each word along the navigation path, which is annoying and distracting for power and specially-abled users, who may rely on these tools. In the illustrated embodiment, navigation system 110 improves navigation and task completion using hotkey or keyboard shortcuts 1010 which are displayed on floating panel 1012 of the GUI and which automatically update.

In response to user input 502 of a hotkey or keyboard shortcuts 1010 for executing an action, the user interface executes the action associated with user input 502. In one embodiment, the user interface displays hotkey or keyboard shortcuts 1010 for all actions for the current zone (e.g., the zone where the cursor or a current selection is located). In addition, the user interface may display only some of hotkey or keyboard shortcuts 1010 for navigations based on the current zone. In addition, or as an alternative, hotkey or keyboard shortcuts 1010 for actions and navigations are updated based on the properties of the currently-displayed data. For example, hotkey or keyboard shortcuts 1010 displayed for many of the actions relating to product data 254 would be different than hotkey or keyboard shortcuts 1010 displayed for scenarios. Hotkey or keyboard shortcuts 1010 may also be updated based on the currently occupied section or part of the section (such as, for example, the search bar, a text input element, selected text, or other interface input or design element), available actions for the current selection, the current zone, a part of the zone where the current selection or cursor is located, and the like. A user of this GUI may simply jump to the products section 904 by input of the keyboard shortcut OPT+P, or by providing any equivalent natural language input, such as, for example, providing a voice input interpreted by NLP engine 214 as equivalent "I want to go to the products section." Using navigation system 110, the user interface provides for navigating quickly from zone to zone, executing available actions, and dynamically altering the order and type of the displayed actions based, at least in part, on the context of the current zone.

Figure 11:
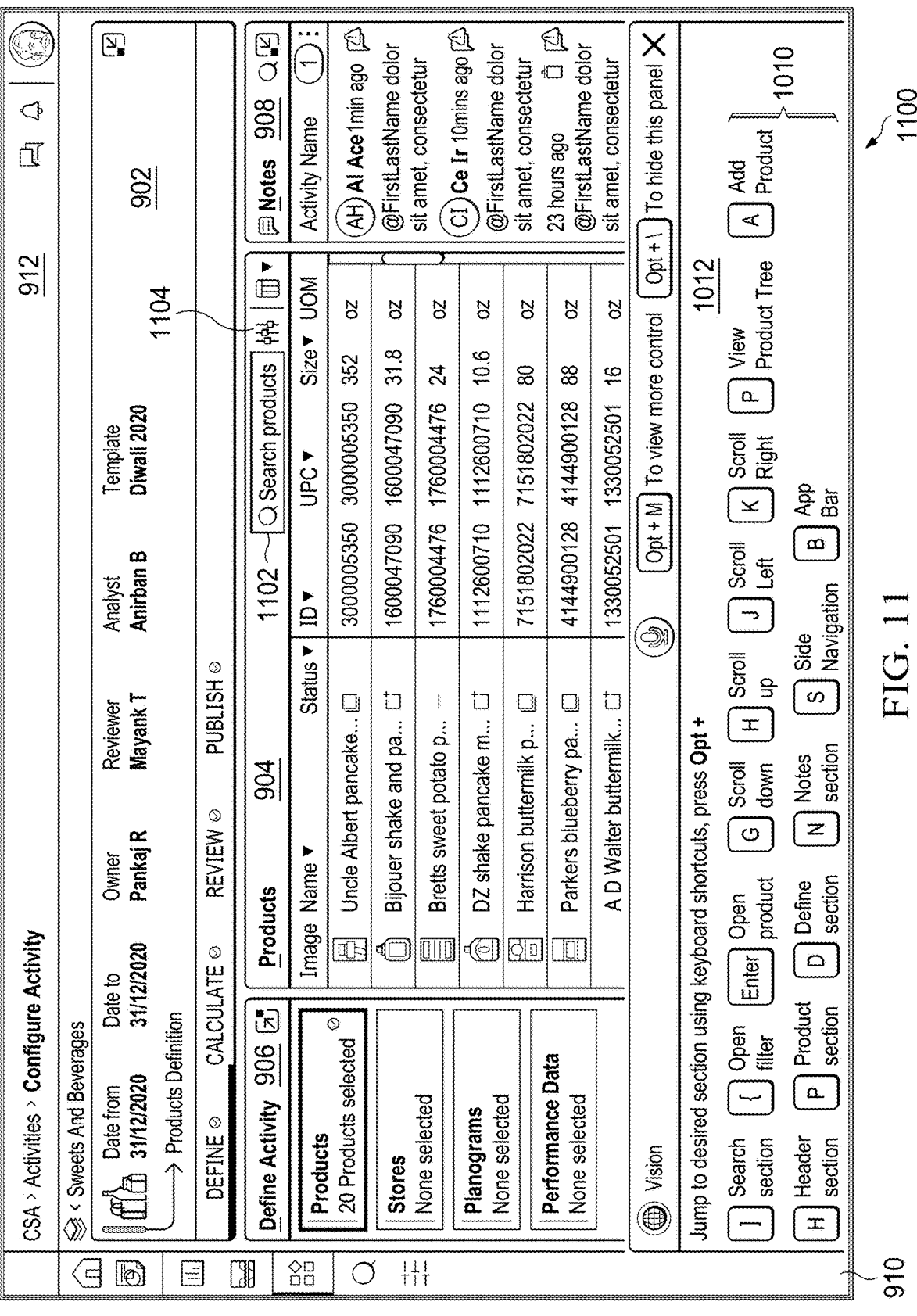
FIG. 11 illustrates an interface feedback GUI, according to an embodiment.

FIG. 11 illustrates interface feedback GUI 1100, according to an embodiment. Navigation system 110 may generate audio or visual feedback, in response to a user action or navigation. Audio feedback may comprise, for example, spoken language generated by one or more digital speakers and announcing the type or result of the navigation or action that was executed. In addition, or as an alternative, visual feedback may be displayed by the user interface. Visual feedback may comprise, for example, text indicating the type or result of the navigation or action that was executed, such as, for example, "you've selected the middle section card P," displayed in response user inputting hotkey or keyboard shortcut 1010 for product section 904. Visual feedback may further comprise displaying graphical user elements to highlight or mark the location of the current selection or the result of an action, which may include, but is not limited to, outlining, highlighting, lightening, shading, or any other visual modification to the appearance of the graphical user element indicating the location or result of the action or navigation.

The systems interface determines the actions and navigations that may be performed on the current card (here, the products section 904) and displays the corresponding hotkeys or keyboard shortcuts 1010 in floating panel 1012. By way of example only and not by way of limitation, the actions and navigations available for the products card comprise: search for a product 1102, open a filter 1104, open a product, scroll in various directions, view product tree, add product, or jump to a particular section of the one or more various section (e.g., header section 902, product section 904, define section 906, notes section 908, side navigation 910, and/or app bar 912).

Figure 12:
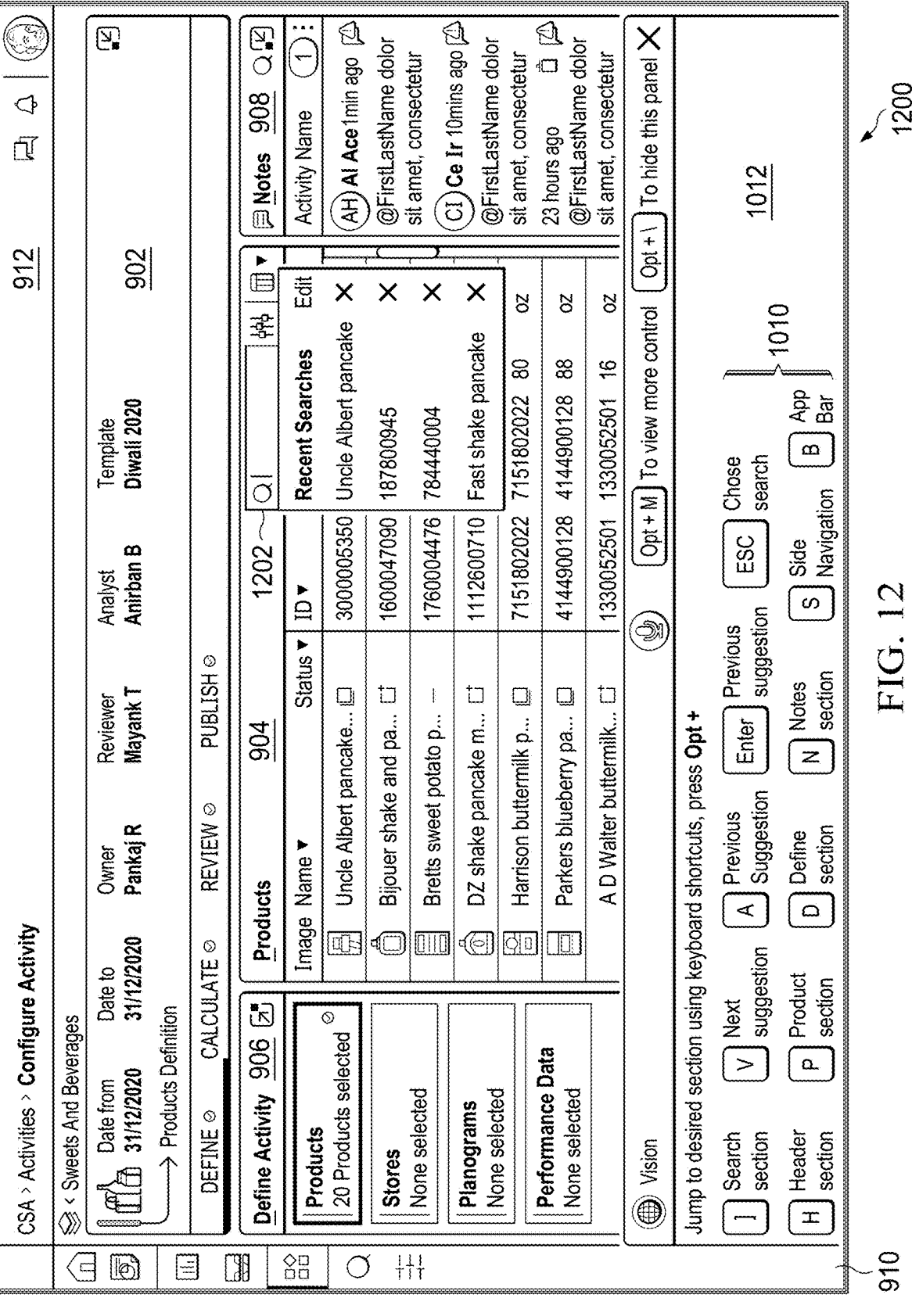
FIG. 12 illustrates context-dependent updating of the hotkeys and keyboard shortcuts, according to an embodiment.

FIG. 12 illustrates context-dependent updating 1200 of hotkeys and keyboard shortcuts 1010, according to an embodiment. In this example, the user interface receives user input 502 decoded to have the intent "searching a product." In response to identifying the intent of user input 502 as "searching a product," interface module 210 selects product search input box 1202, which is indicated by an outline around the graphical element comprising product search input box 1202.

Figure 13:
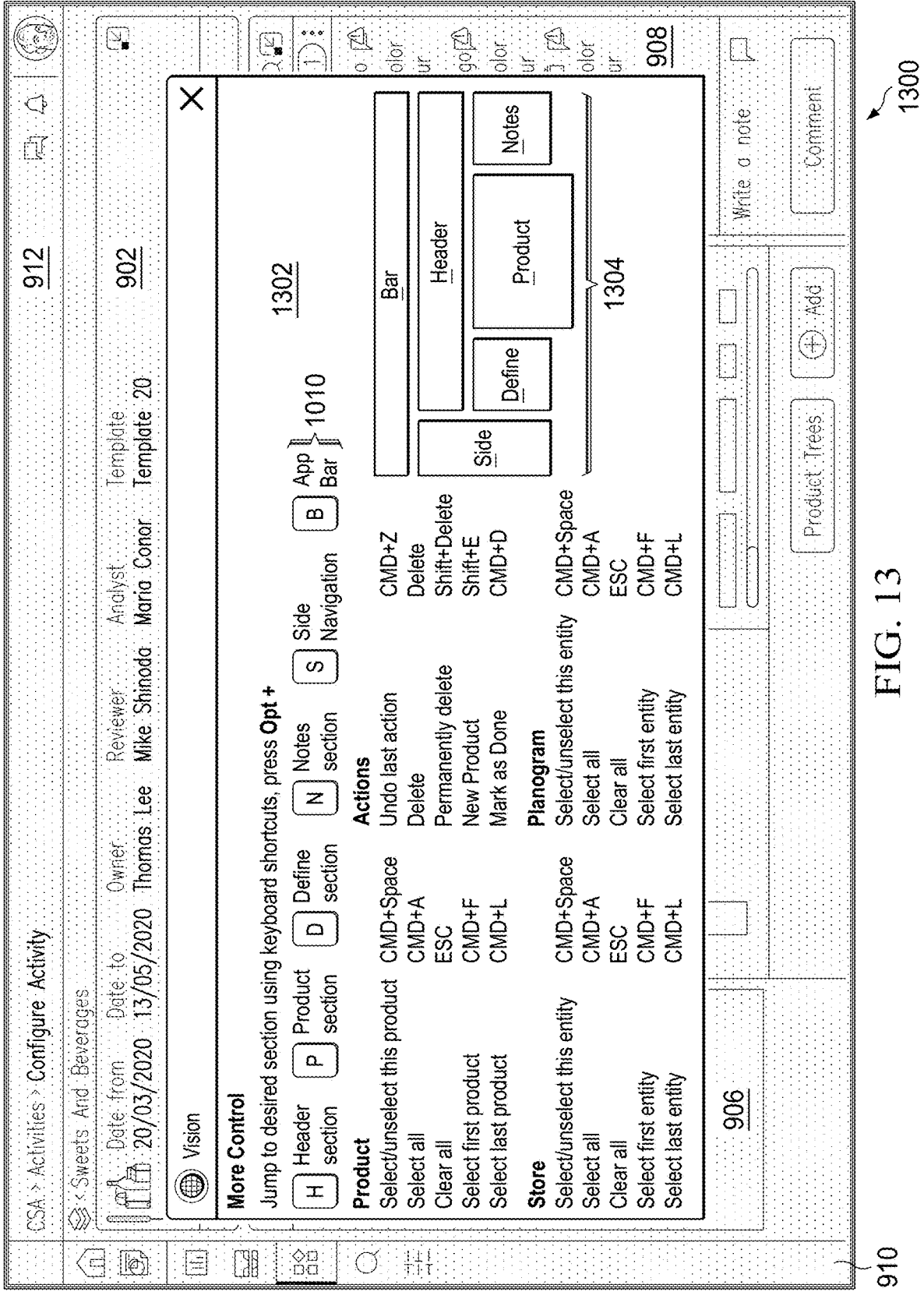
FIG. 13 illustrates a card visualization for hotkeys and keyboard shortcuts, according to an embodiment.

FIG. 13 illustrates card visualization GUI 1300 for hotkeys and keyboard shortcuts 1010, according to an embodiment. Card visualization GUI 1300 comprises control panel 1302. In this example, the user interface has received user input 502 to view more controls and, in response to and based at least in part on user input 502, user input visualization is updated to display additional action and navigation hotkeys and keyboard shortcuts 1010. In one embodiment, navigation hotkeys and shortcuts 1010 are displayed in connection with layout map 1304 that displays the arrangement of the sections of the card-design user interface and hotkey or keyboard shortcuts 1010 for navigating directly to any section. In addition, control panel 1302 comprising hotkeys and keyboard shortcuts 1010 may be hidden or removed in response to user input 502 (here, Opt+\). To view more controls, user input 502 may comprise (Opt+M). Although particular user inputs 502 are shown and described for particular actions, and navigations embodiments contemplate any suitable user input 502 to access any action or navigation, according to particular needs.

In some embodiments, the task associated with the user intent may require additional information to complete one or more slots or entities. As described in further detail below, control panel 1302 prefills information identified from the user intent and provides input elements (e.g., a text box, drop down list, search bar, and the like) that receive information that was not identified from the user intent. By way of example only and not by way of limitation, an example of control panel 1302, described in further detail below, is generated in response to a natural language input comprising an intent to create a scenario. In the example embodiment, control panel 1302 is displayed on card visualization GUI 1300 in front of the currently displayed sections, but implementations may provide any suitable configuration or location of the create scenario task visualization, according to particular needs. Continuing with this example, card visualization GUI 1300 may display control panel 1302 comprising a guided interface that displays one or more interactive visual elements providing for confirmation or modification of information decoded from the natural language input as well as one or more interactive visual elements providing for input of information which was not identified from the natural language input. The create scenario task visualization dynamically updates number of steps needed to complete the task and guides a user from interface location to another interface location until the steps are completed and the new scenario is created.

Figure 14:
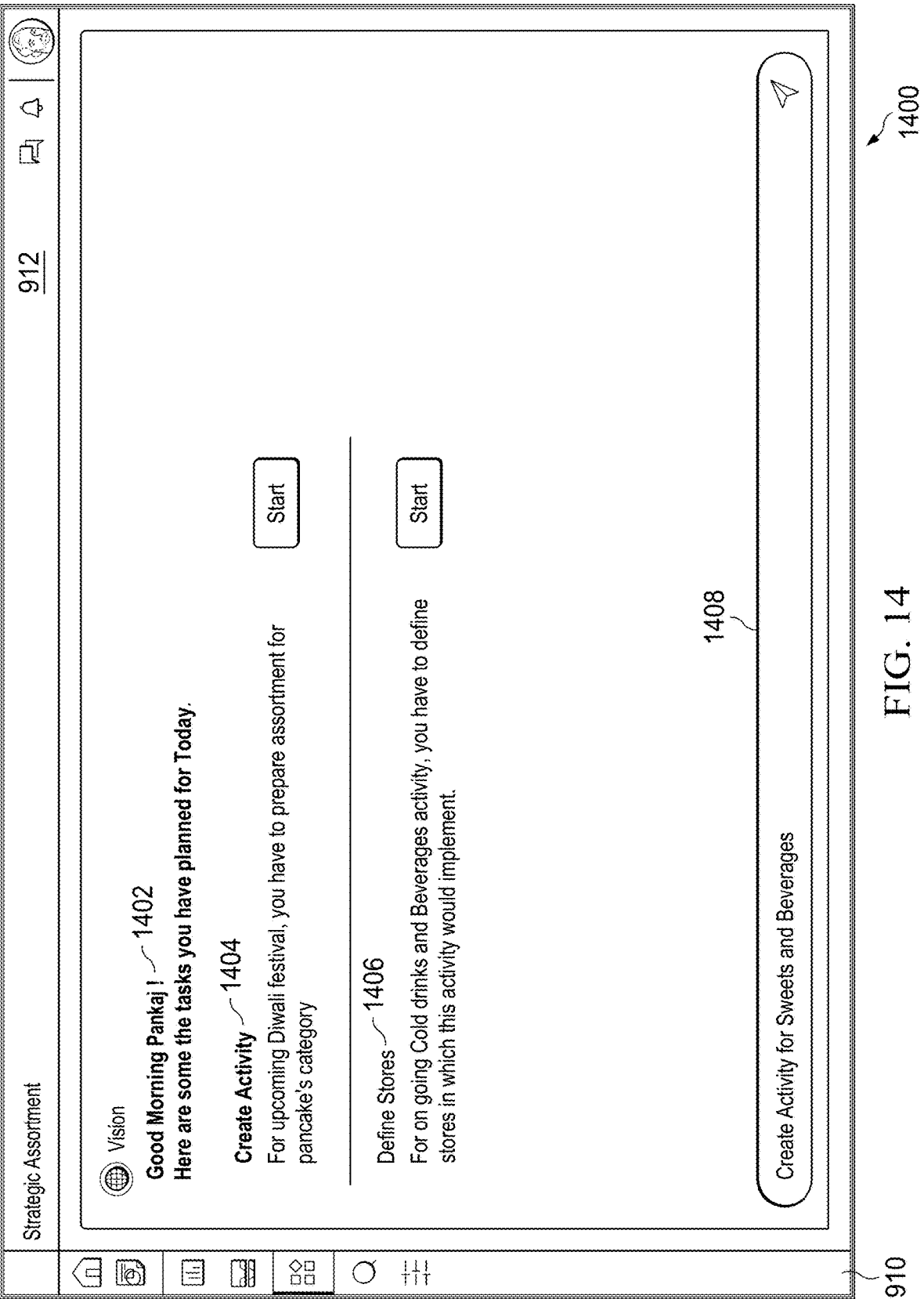
FIG. 14 illustrates a first example visualization of the user interface, according to an embodiment.

FIG. 14 illustrates first visualization 1400 of the user interface, according to an embodiment. As disclosed above, conversation engine 212 may display task list 306 assigned to current user 1402 interacting with the user interface. By way of example only and not by way of limitation, the illustrated example conversation engine 212 displays task list 306 with two tasks: creating activity 1404 for the upcoming Diwali festival and defining stores 1406 for cold drinks and beverages. In response to user input 502 indicating selection of a task from task list 306 (e.g., clicking a start button that corresponds to the task), the interface system initiates the selected task. Although task list 306 may be used to initiate a task that is currently assigned to user 1402, a task that is associated with a role user 1402, an in-progress or recurring task, or the like, the task list 306 may not provide all or even many of the tasks available to the user or that might be beneficial to the user's role. In these cases, the user may simply type or speak a natural language input to conversation engine 212, which will decode the natural language input to determine the intent and match the intent to a definition for the intent in knowledge base 216. The illustrated embodiment provides for a text or voice-based input using text input box 1408 at the bottom of first visualization 1400. A user may, for example, say or type "I need to create some activities for 'Sweets and Beverages" to initiate a task for defining sweets and beverages for a particular product assortment. Continuing with this example, conversation engine 212 may display a natural language response or a response comprising textual and graphical elements that indicates user input 502 was interpreted to initiate the create activity task for sweets and beverage products, this task will require two steps, and particular slots or entities are needed at each step, as described in further detail below.

Figure 15:
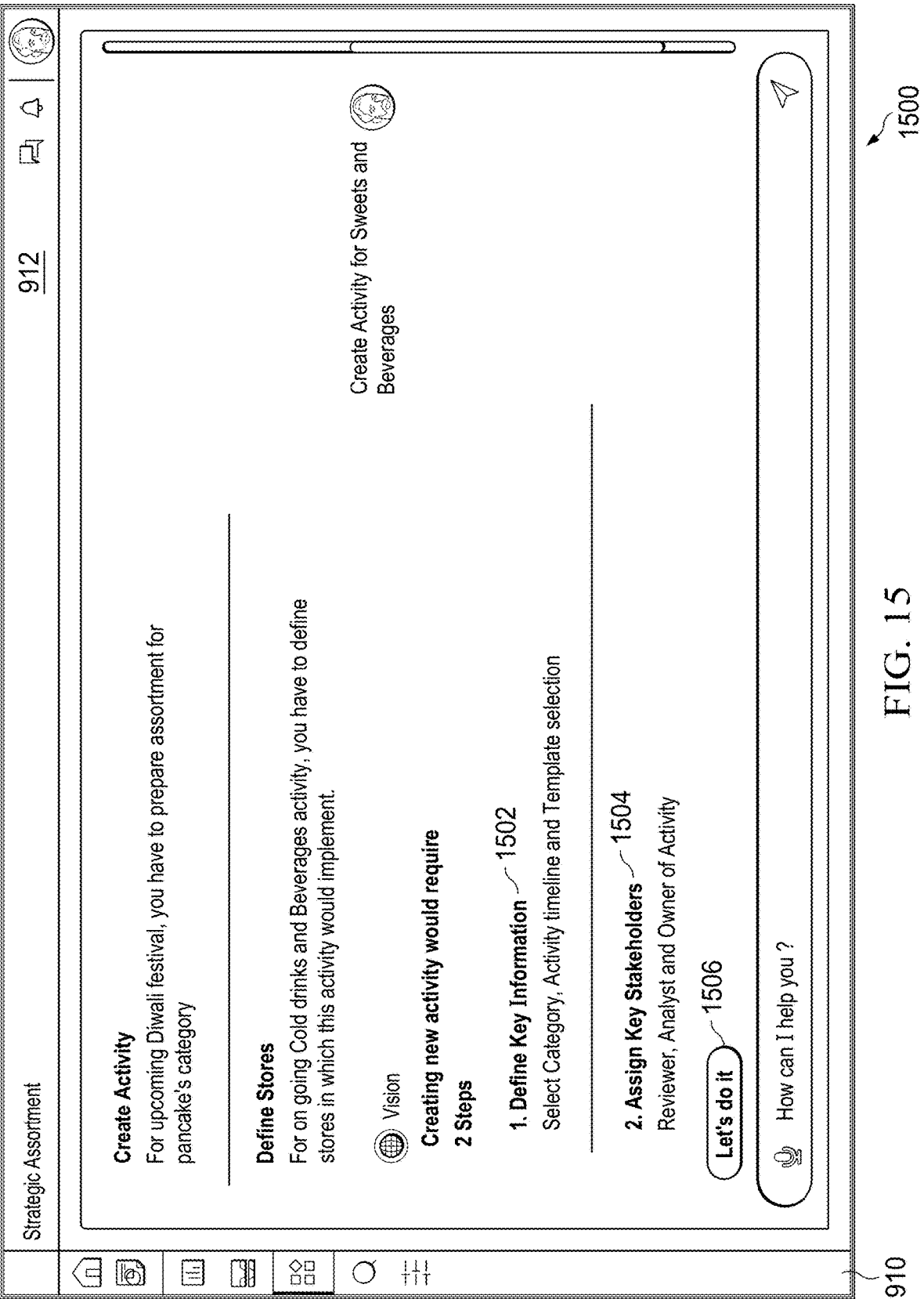
FIG. 15 illustrates a second example visualization of the user interface after identifying the tasks, steps, and/or slots assigned to each intent in the user input, according to an embodiment.

FIG. 15 illustrates second visualization 1500 of the user interface after identifying the tasks, steps, and/or slots assigned to each intent in user input 502, according to an embodiment. As disclosed above, knowledge base 216 receives the user intent after processing from NLP engine 214 and identifies the action most likely intended by user input 502.

Navigation system 110 determines the user's intent (or objective) by, at least in part, decoding the natural language input. NLP engine 214 classifies the information and displays for a particular task (such as, for example, the previously-described "creating activity for sweets and beverages" activity), the required steps, the quantity of steps, currently-input data, and/or missing data, needed to complete the task. By way of example only and not by way of limitation, conversation engine 212 displays, for the create new activity task, two steps: define key information 1502 and assign key stakeholders 1504. Conversation engine 212 displays, next to each step, the slots or entities that may receive or require a data input or selection. Continuing with the create new activity task example, navigation system 110 identified that the create activity task is for beverages and sweets, and the first step may receive or require selecting a category, an activity timeline, and a template, whereas the second step may receive or require assignment of a reviewer, analyst, and owner to the new activity. To begin the identified task, the user interface displays task initiation button 1506. According to the illustrated embodiment, task initiation button 1506 is displayed next to the create activity task and comprises the text, "Let's do it." In response to user selection of task initiation button 1506, the user interface displays a prompt to the respective area and the user interface visualization displays an instructive step-by-step sequence of interactive visual elements, such as popups, text entry boxes, drop-down lists, search bars, selectable graphical elements, buttons, keyboard shortcuts 1010, and the like to execute one or more actions for each step of the task.

Figure 16:
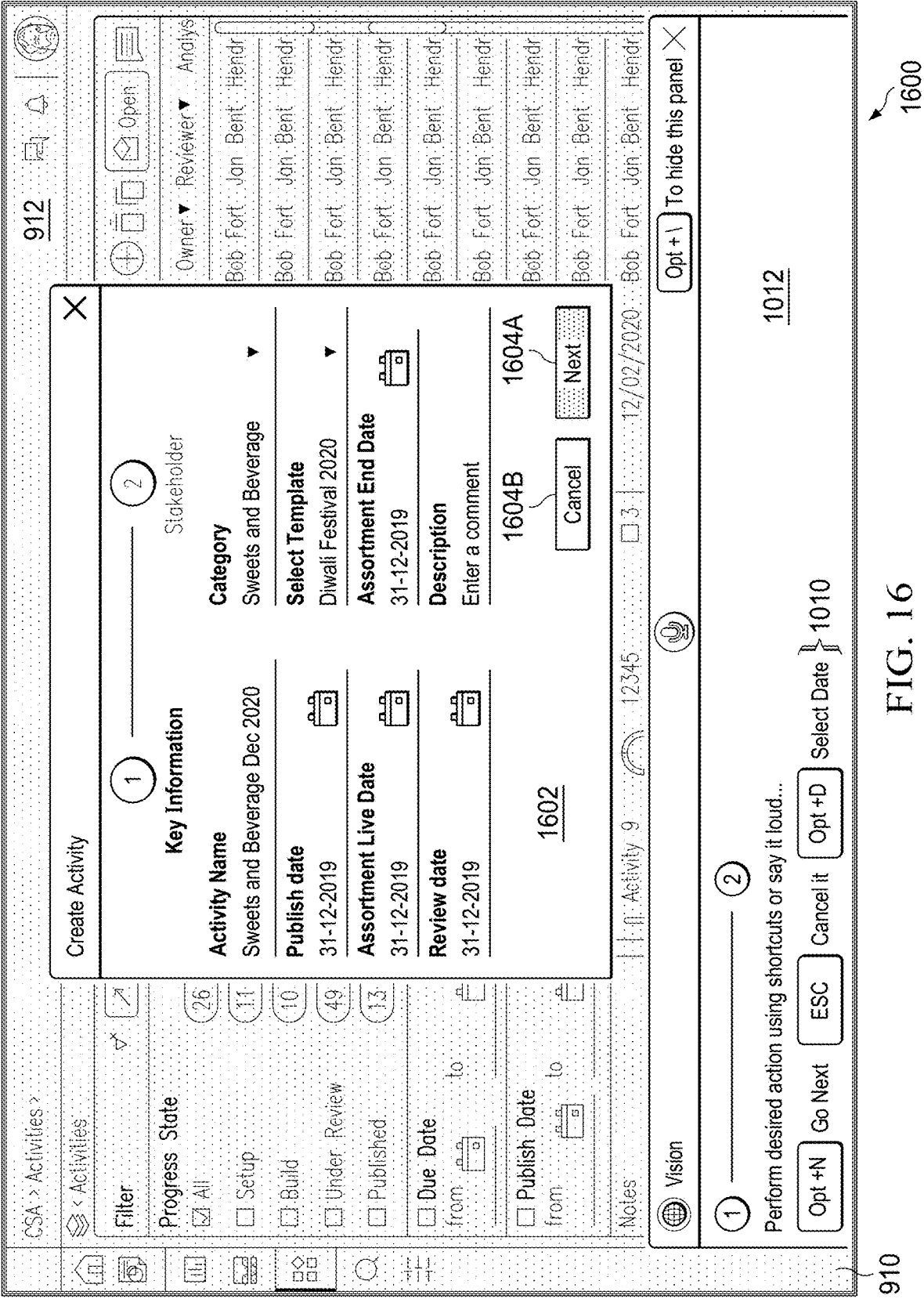
FIG. 16 illustrates a guided task navigation, according to an embodiment.

FIG. 16 illustrates guided task navigation 1600, according to an embodiment. As disclosed above, navigation system 110 receives or determines the quantity of steps needed to complete the intended task or action. Guided task navigation 1700 may, according to some embodiments, display each step on a different card. Guided task navigation card 1602 may be navigated by selecting interactive graphical elements (such as, for example, user-selectable buttons 1604A and 1604B for cancel, next, and back) located on guided task navigation card 1602 and/or one or more hotkeys or shortcuts 1010 displayed on floating panel 1012 of the GUI. At each step of guided task navigation 1600, the GUI may display a context-specific interactive visualization, such as, card visualization 1302, which provides interactive graphic elements for confirming and modifying slots or entities that were previously identified. In addition, the context-specific interactive visualization provides interactive graphic elements for creating or selecting slots or entities that are unidentified.

Figure 17:
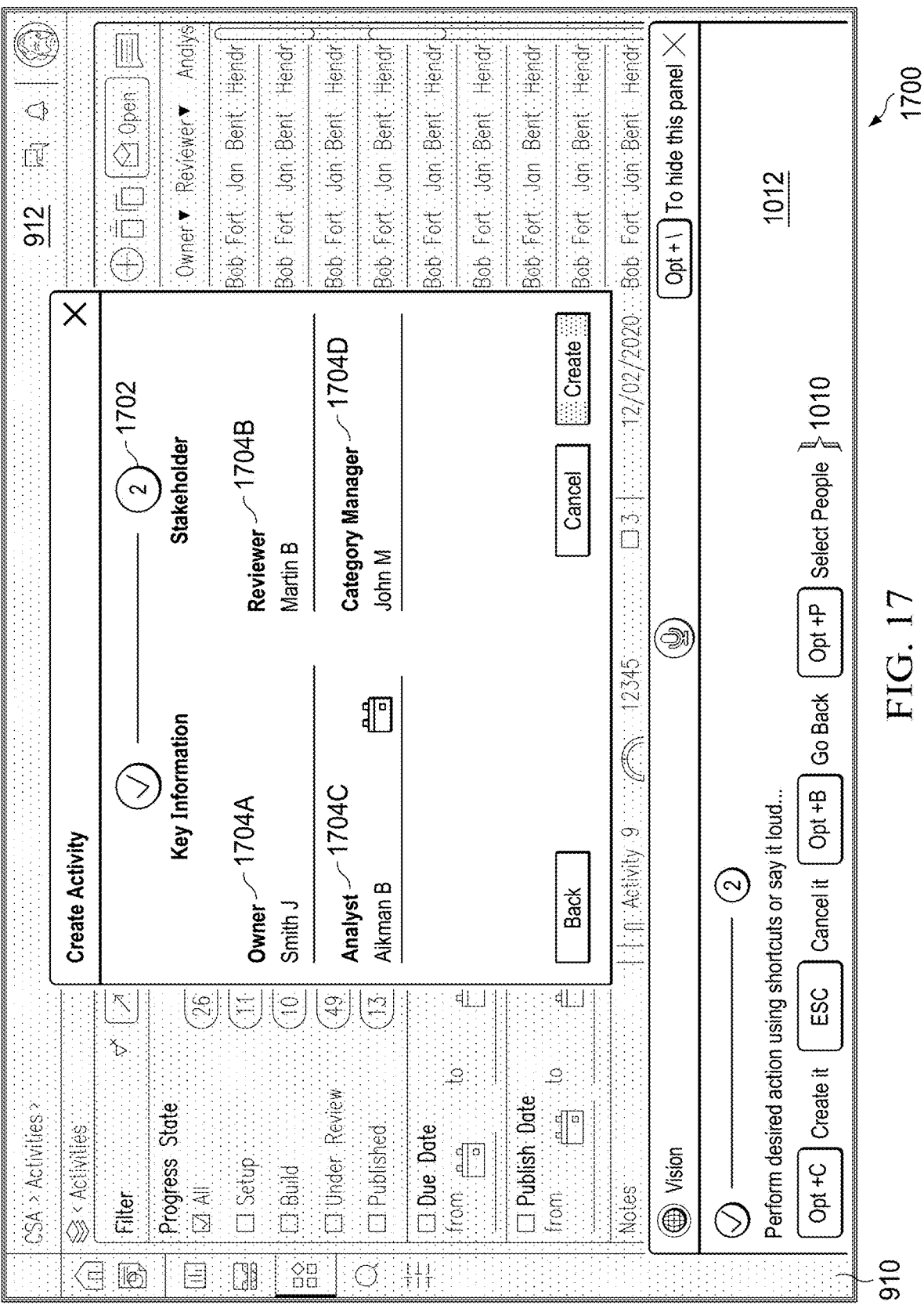
FIG. 17 illustrates the second step of the guided task navigation, according to an embodiment.

FIG. 17 illustrates second step 1700 of guided task navigation 100, according to an embodiment. Second step 1700 of guided task navigation 1600 for the create activity task prompts the user for stakeholder information 1702. In one embodiment, the system interface receives one or more user inputs 502 to select the owner 1704A, reviewer 1704B, analyst 1704C, and category manager 1704D. Embodiments may comprise automatic searching and input of users having appropriate roles for the stakeholders of the second task. In addition, hotkeys and keyboard shortcuts 1010 are updated based on the current context to display context-specific actions or navigations that are available based on the current selection and location within the user interface flow. As disclosed above, the actions and navigations identified by hotkeys and keyboard shortcuts 1010 may be initiated by any suitable user input 502, according to particular needs. Embodiments contemplate automatically initiating an action or navigation without receiving user input 502. The interface system may automatically initiate an action or navigation when, for example, when the action or navigation is required by current guided task navigation 1600. Embodiments further contemplate providing a time period in which the action or navigation is undone or not executed based on receiving a suitable user input 502.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for interacting with a chat bot, comprising:
a system architecture comprising, a server, an interface module, a natural language response engine, a conversation engine, a knowledge base, and a database;
the server, comprising a processor and memory, and configured to:
interact, by the interface module, with a user using text or voice-based natural language by receiving natural language input from the user to create an activity;
perform, by the natural language response engine, natural language processing to extract an intent of the user, wherein the intent is mapped to one or more meta-classes;
perform, by the knowledge base, a task analysis on the extracted intent to determine at least one task and required slots, wherein the knowledge base further comprises functional workflows;

receive, by the natural language response engine, a response from the knowledge base comprising a task identity, a number of required steps and missing slots;

transform, by the natural language response engine, the response from the knowledge base to a natural language response; and display, by the conversation engine, the natural language response.

2. The system of claim 1, wherein the intent comprises one or more of: a category type, a timeline type and an owner.

3. The system of claim 1, wherein the knowledge base comprises intent-driven markers on layouts which comprises actions and tasks that are possible on the layouts.

4. The system of claim 1, wherein the displayed natural language response comprises a prompt for the user to execute guided navigation.

5. The system of claim 1, wherein the knowledge base comprises functional workflows comprising a logical sequence of actions.

6. The system of claim 1, wherein the conversation engine comprises a chatbot.

7. The system of claim 1, wherein the functional workflows comprise operations and tasks that are coupled with a business objective.

8. A computer-implemented method for interacting with a chat bot, comprising:

interacting, by an interface module of a server, with a user using text or voice-based natural language by receiving natural language input from the user to create an activity, wherein the server comprises a processor and memory;

performing, by a natural language processing engine of the server, natural language processing to extract an intent of the user, wherein the intent is mapped to one or more meta-classes;

performing, by a knowledge base, a task analysis on the extracted intent to determine at least one task and required slots, wherein the knowledge based further comprises functional workflows;

receiving, by the natural language processing engine, a response from the knowledge base comprising a task identity, a number of required steps and missing slots;

transforming, by the natural language processing engine, the response from the knowledge base to a natural language response; and displaying, by a conversation engine, the natural language response.

9. The computer-implemented method of claim 8, wherein the intent comprises one or more of: a category type, a timeline type and an owner.

10. The computer-implemented method of claim 8, wherein the knowledge base comprises intent-driven markers on layouts which comprises actions and tasks that are possible on the layouts.

11. The computer-implemented method of claim 8, wherein the displayed natural language response comprises a prompt for the user to execute guided navigation.

12. The computer-implemented method of claim 8, wherein the knowledge base comprises functional workflows comprising a logical sequence of actions.

13. The computer-implemented method of claim 8, wherein the conversation engine comprises a chatbot.

14. The computer-implemented method of claim 8, wherein the functional workflows comprise operations and tasks that are coupled with a business objective.

15. A non-transitory computer-readable storage medium embodied with software for interacting with a chat bot, the software when executed by a server is configured to:

interact, by an interface module of the server, with a user using text or voice-based natural language by receiving natural language input from the user to create an activity, wherein the server comprises a processor and memory;

perform, by a natural language processing engine of the server, natural language processing to extract an intent of the user, wherein the intent is mapped to one or more meta-classes;

perform, by a knowledge base, a tasks analysis on the extracted intent to determine at least one task and required slots, wherein the knowledge base further comprises functional workflows;

receive, by the natural language processing engine, a response from the knowledge base comprising a task identity, a number of required steps and missing slots;

transform, by the natural language processing engine, the response from the knowledge base to a natural language response; and display, by a conversation engine, the natural language response.

16. The non-transitory computer-readable storage medium of claim 15, wherein the intent comprises one or more of: a category type, a timeline type and an owner.

17. The non-transitory computer-readable storage medium of claim 15, wherein the knowledge base comprises intent-driven markers on layouts which comprises actions and tasks that are possible on the layouts.

18. The non-transitory computer-readable storage medium of claim 16, wherein the displayed natural language response comprises a prompt for the user to execute guided navigation.

19. The non-transitory computer-readable storage medium of claim 15, wherein the knowledge base comprises functional workflows comprising a logical sequence of actions.

20. The non-transitory computer-readable storage medium of claim 15, wherein the conversation engine comprises a chatbot.

\* \* \* \* \*